(12) United States Patent
Sobh

(10) Patent No.: US 11,818,285 B2
(45) Date of Patent: *Nov. 14, 2023

(54) DEVICE WITH MULTI-DIRECTIONAL INDUCTIVE CHARGER FOR CHARGING PORTABLE ELECTRONIC DEVICES

(71) Applicant: Adeeb Sobh, Dearborn, MI (US)

(72) Inventor: Adeeb Sobh, Dearborn, MI (US)

(*) Notice: Subject to any disclaimer, the term of this patent is extended or adjusted under 35 U.S.C. 154(b) by 131 days.

This patent is subject to a terminal disclaimer.

(21) Appl. No.: 17/416,967

(22) PCT Filed: Dec. 20, 2019

(86) PCT No.: PCT/US2019/067849
§ 371 (c)(1),
(2) Date: Jun. 21, 2021

(87) PCT Pub. No.: WO2020/132442
PCT Pub. Date: Jun. 25, 2020

(65) Prior Publication Data
US 2022/0085629 A1 Mar. 17, 2022

Related U.S. Application Data

(63) Continuation-in-part of application No. 16/443,804, filed on Jun. 17, 2019, now Pat. No. 11,190,035.
(Continued)

(51) Int. Cl.
*H01M 10/46* (2006.01)
*H04M 1/04* (2006.01)
(Continued)

(52) U.S. Cl.
CPC .............. *H04M 1/04* (2013.01); *H01R 13/72* (2013.01); *H01R 25/003* (2013.01); *H02J 7/00* (2013.01);
(Continued)

(58) Field of Classification Search
CPC ........ H02J 7/0045; H02J 7/0042; H02J 50/10; H02J 50/90; H02J 50/005; H02J 7/00;
(Continued)

(56) References Cited

U.S. PATENT DOCUMENTS 914,772 A   3/1909  Williamson
8,560,031 B2  10/2013  Barnett et al.
(Continued)

OTHER PUBLICATIONS

International Search Report and Written Opinion dated Feb. 10, 2020.
European Search Report dated Jul. 27, 2022.

*Primary Examiner* — Edward Tso
(74) *Attorney, Agent, or Firm* — Dickinson Wright PLLC

(57) ABSTRACT

A device for charging a portable electronic device includes a housing having a first surface configured to adhere to the portable electronic device, and a cable having an end that is configured to connect to a power source. The cable may have another end that is connected to an inductive charging component and/or another connector of a cable that connects to a charging port of the portable electronic device. A battery of the portable electronic device is capable of being charged when either the connector of the cable is connected to the charging port of the portable electronic device or the other end of the cable is connected to the power source or via the inductive charging component. The housing defines a cavity configured to store the cable within the cavity when the cable is not in use.

20 Claims, 24 Drawing Sheets

Related U.S. Application Data

(60) Provisional application No. 62/783,659, filed on Dec. 21, 2018.

(51) Int. Cl.

| | | |
|---|---|---|
| *H02J 7/00* | (2006.01) | |
| *H01R 13/72* | (2006.01) | |
| *H01R 25/00* | (2006.01) | |
| *H02J 50/10* | (2016.01) | |
| *H04B 1/3883* | (2015.01) | |
| *H04B 1/3888* | (2015.01) | |
| *H02J 50/00* | (2016.01) | |
| *H04B 5/00* | (2006.01) | |
| *H04M 1/02* | (2006.01) | |

(52) U.S. Cl.
CPC .......... *H02J 7/0045* (2013.01); *H02J 50/005* (2020.01); *H02J 50/10* (2016.02); *H04B 1/3883* (2013.01); *H04B 1/3888* (2013.01); *H04B 5/0037* (2013.01); *H04B 5/0075* (2013.01); *H04M 1/0262* (2013.01); *Y02B 40/00* (2013.01)

(58) Field of Classification Search
CPC .. H04B 1/3883; H04B 1/3888; H04B 5/0075; H04B 5/0037; H01R 31/06; H01R 25/003; H01R 13/72; H04M 1/04; H04M 1/0262; Y02B 40/00
USPC .................................. 320/107, 108, 114, 115
See application file for complete search history.

(56) References Cited

U.S. PATENT DOCUMENTS

| | | |
|---|---|---|
| 9,673,852 B1 | 6/2017 | Crossley |
| 9,992,887 B2 | 6/2018 | Li et al. |
| 10,110,048 B2 | 10/2018 | Loewen |
| 11,190,035 B2 * | 11/2021 | Sobh .................... H02J 50/005 |
| 2008/0142324 A1 | 6/2008 | Chou |
| 2011/0084081 A1 | 4/2011 | Chung et al. |
| 2012/0013295 A1 | 1/2012 | Yeh |
| 2014/0253038 A1 | 9/2014 | Posa |
| 2015/0245126 A1 | 8/2015 | Shaffer |
| 2015/0364875 A1 | 12/2015 | Ginsberg |
| 2016/0301444 A1 | 10/2016 | George et al. |
| 2016/0043514 A1 | 11/2016 | George et al. |
| 2017/0142853 A1 | 5/2017 | Li et al. |
| 2017/0030209 A1 | 10/2017 | Miller et al. |
| 2018/0220782 A1 | 8/2018 | Mody et al. |
| 2018/0262603 A1 | 9/2018 | Richter |

* cited by examiner

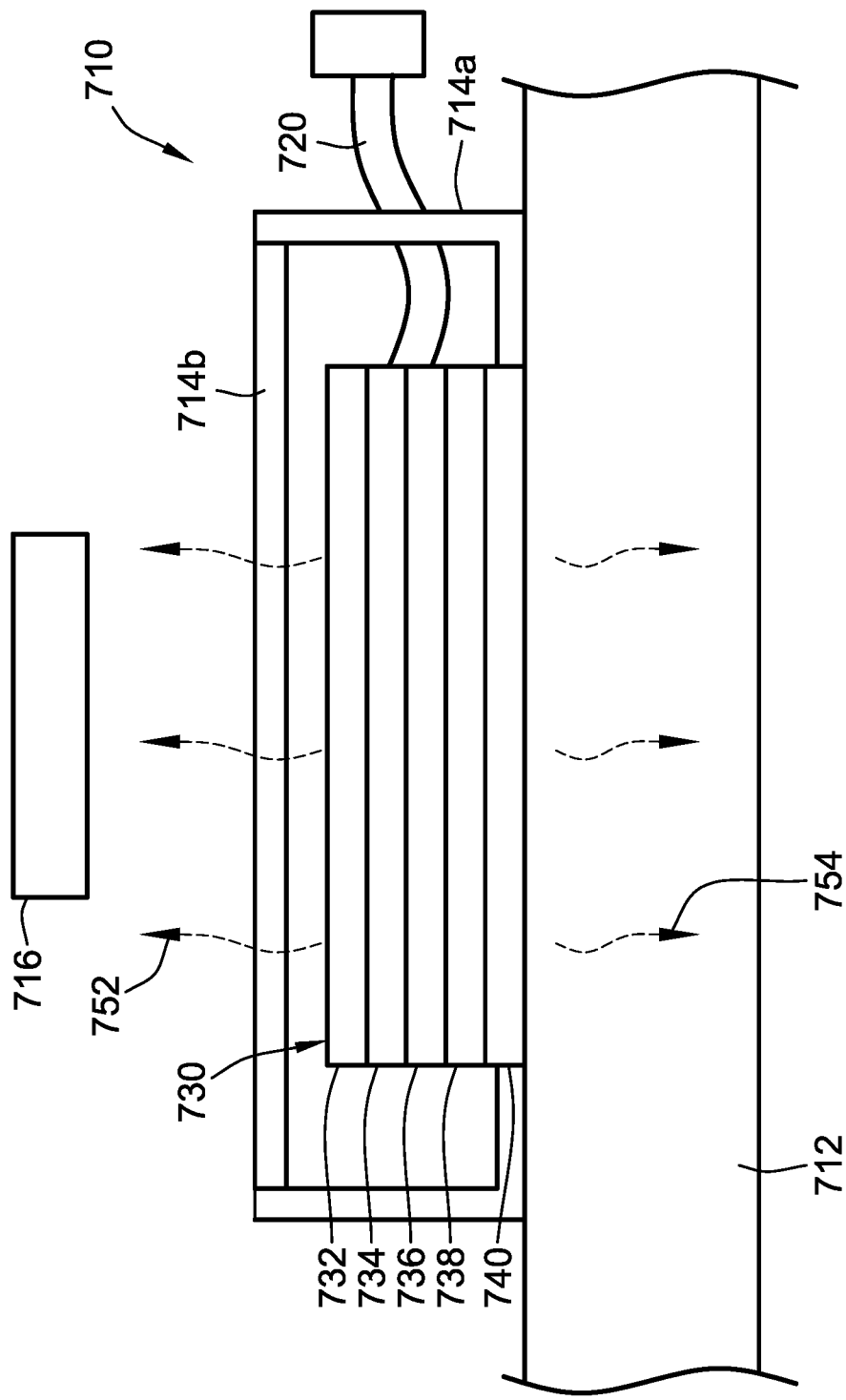

DEVICE WITH MULTI-DIRECTIONAL INDUCTIVE CHARGER FOR CHARGING PORTABLE ELECTRONIC DEVICES

CROSS-REFERENCE TO RELATED APPLICATION

This application claims priority to PCT Application No. PCT/US2019/067849, filed Dec. 20, 2019, which claims priority to U.S. Ser. No. 16/443,804, filed Jun. 17, 2019 and U.S. Provisional Patent Application No. 62/783,659, filed on Dec. 21, 2018, entitled "DEVICE FOR CHARGING PORTABLE ELECTRONIC DEVICES", the contents of which are hereby incorporated by reference in its entirety.

BACKGROUND

1. Field of the Invention

The present invention generally relates to devices for charging electronics, especially portable electronics, such as mobile devices.

2. Description of Related Art

Portable electronic devices, such as mobile devices, generally contain a lithium-ion battery that is rechargeable. Depending on the operator's use of the portable electronic device, the battery of the portable electronic device may be able to provide power to power the device for a period of time ranging from six hours to more than a day. However, the reason for this large fluctuation between how long a portable electronic device can be powered by its battery is because the operators use of the portable electronic device, and also the physical characteristics of the portable electronic device, such as screen size, processing power, etc., can add numerous and significant variables regarding the length of time the battery can provide power to the portable electronic device.

Because the battery of the portable electronic device is rechargeable, one can simply connect the cable to a charging port of the portable electronic device into a power source, such as a USB port or a wall socket. However, most operators of portable electronic devices do not carry the appropriate cabling so as to allow for the charging of their portable electronic device because the cabling of the portable electronic device can be rather clumsy and bulky.

Further objects, features, and advantages of this invention will become readily apparent to persons skilled in the art after a review of the following description, with reference to the drawings and claims that are appended to and form a part of this specification.

BRIEF DESCRIPTION OF THE DRAWINGS

FIG. 7A is a sectional side view of the device;

SUMMARY

A device for charging a portable electronic device includes a housing having a first surface configured to adhere to the portable electronic device, and a cable having an end that is configured to connect to a power source. The cable may have another end that is connected to an inductive charging component and/or another connector of a cable that connects to a charging port of the portable electronic device. A battery of the portable electronic device is capable of being charged when either the connector of the cable is connected to the charging port of the portable electronic device or the other end of the cable is connected to the power source or via the inductive charging component. The housing defines a cavity configured to store the cable within the cavity when the cable is not in use.

DETAILED DESCRIPTION

Figure 1A:
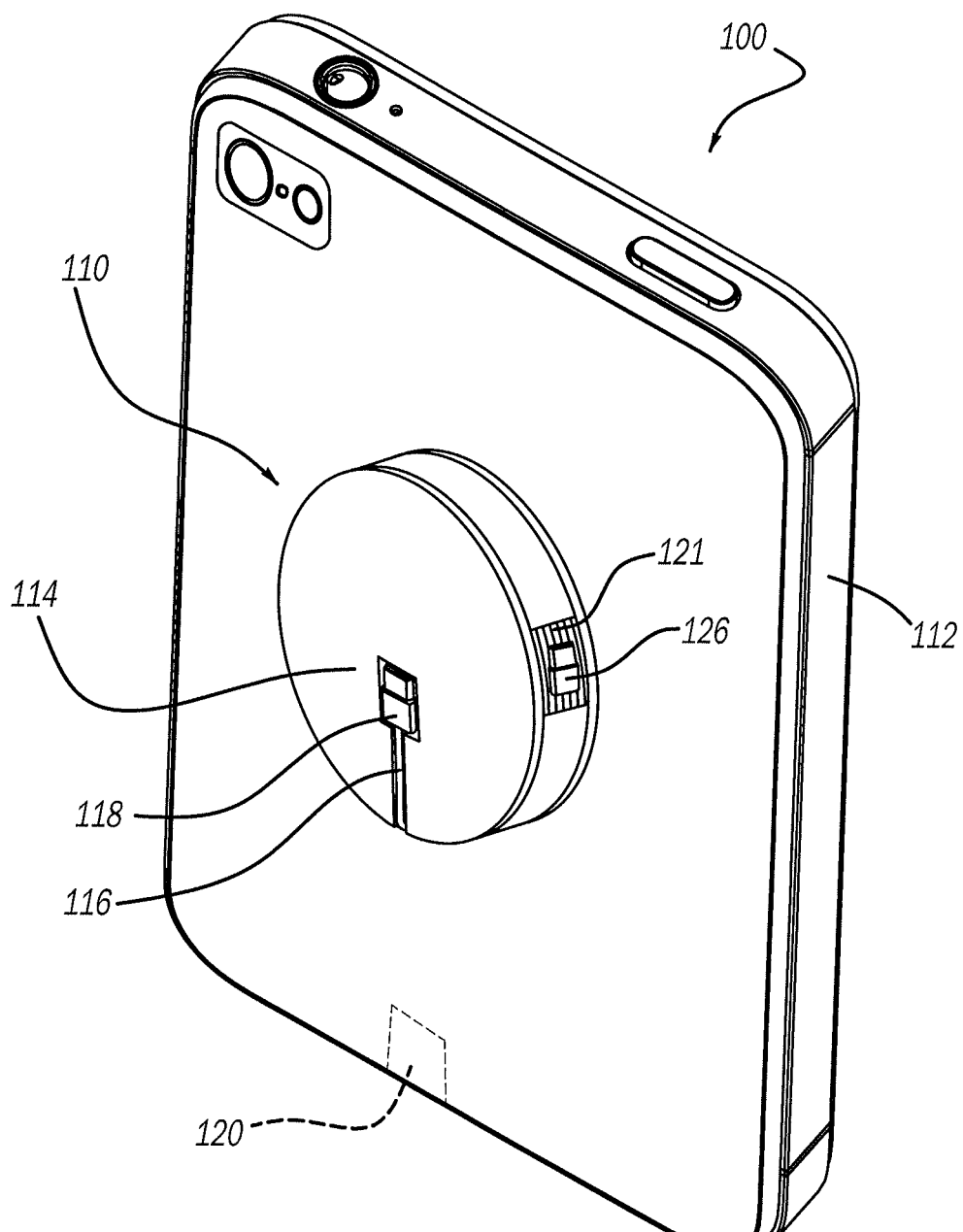
FIGS. 1A and 1B illustrate a system having a device for charging a portable electronic device.

Referring to FIG. 1A, a system 100 including a device 110 for charging a portable electronic device, such as a mobile phone 112 as shown. It should be understood, that while a mobile phone 112 is shown in the examples provided in the specification, it should be understood that the mobile phone 112 may be any type of electronic device, especially portable electronic devices. As such, instead of a mobile phone 112, the portable electronic device could be a tablet computer, notebook computer, speaker, music playback device, portable radio, and the like. Again, the portable electronic device could encompass any one of a number of different electronic devices that are powered by a battery.

The housing 114, as will be described in greater detail in the figures and paragraphs that follow, includes a cable 116 having a connector 118. The connector 118 may connect to a power source so as to provide power to the mobile phone 112 through either an inductive charging component or via the charging port 120 of the mobile phone 112. The connector 118 and portions of the cable 116 may be removably coupled to a cavity 123. The purpose of the cavity 123 is to allow neat storage of the connector 118 and/or the cable 116 so that the connector 118 and/or the cable 116 is generally flush with the overall surface of the device 110. The housing 114 may be mounted to the mobile device 112 any appropriate means for connecting one service to another. For example, the housing 114 may be mounted to the mobile device 12 through the use of an adhesive, magnets, air suction material, or other means for mounting the housing 114 to the mobile device 112.

Figure 1B:
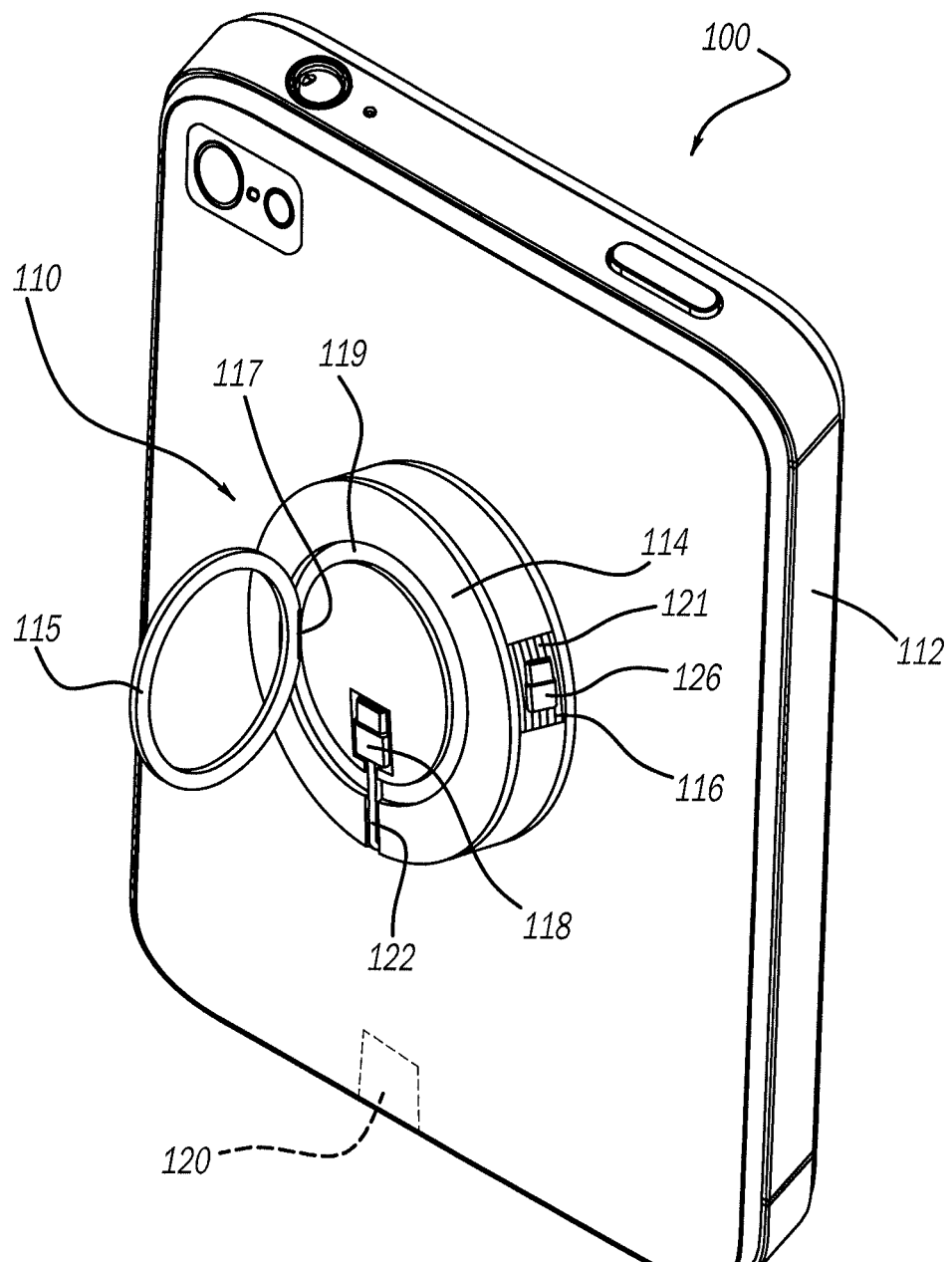

FIG. 1B illustrates a slightly different variation of the device 110 of FIG. 1A. Moreover, in this example, the device 110 of FIG. 1B includes a support member 115 in the shape of a ring. The support member 115 can take any one of a number of different shapes and does not necessarily need to take a circular shape is shown. Furthermore, the support member 115 is shown to be a ring that defines a cavity. As this is just an example, the support member 115 may be devoid of such a cavity.

The support member 115 generally rests within a channel 119 formed on a surface of the device 110. The channel 119 allows the support member 115 to rest within the channel 119 when not in use. The support member 115 is specifically attached to the device 110 via the use of a hinge 117. The hinge 117 allows the support member 115 to extend outward into an extended position, as shown in FIG. 1B. When extended as shown, the support member 115 can act as a support for supporting the mobile device 112 on a flat surface, such as a table. The hinge 117 that is connected to the support member 115 can rotate in a circular direction. This allows the support member 115 to not only swivel with respect to the hinge 117, but because the hinge 117 can rotate in a circular direction, the member 115 can essentially swivel with respect to anywhere along where the hinge 117 has rotated to.

The support member 115, because it is shaped as a ring having a cavity, can interact with one or more fingers of a user of the mobile device 112 so as to allow the mobile device 112 to be gripped better by the user. When not used by the user, the support member 115 can be neatly stored in a retracted position within the channel 119.

Figure 2A:
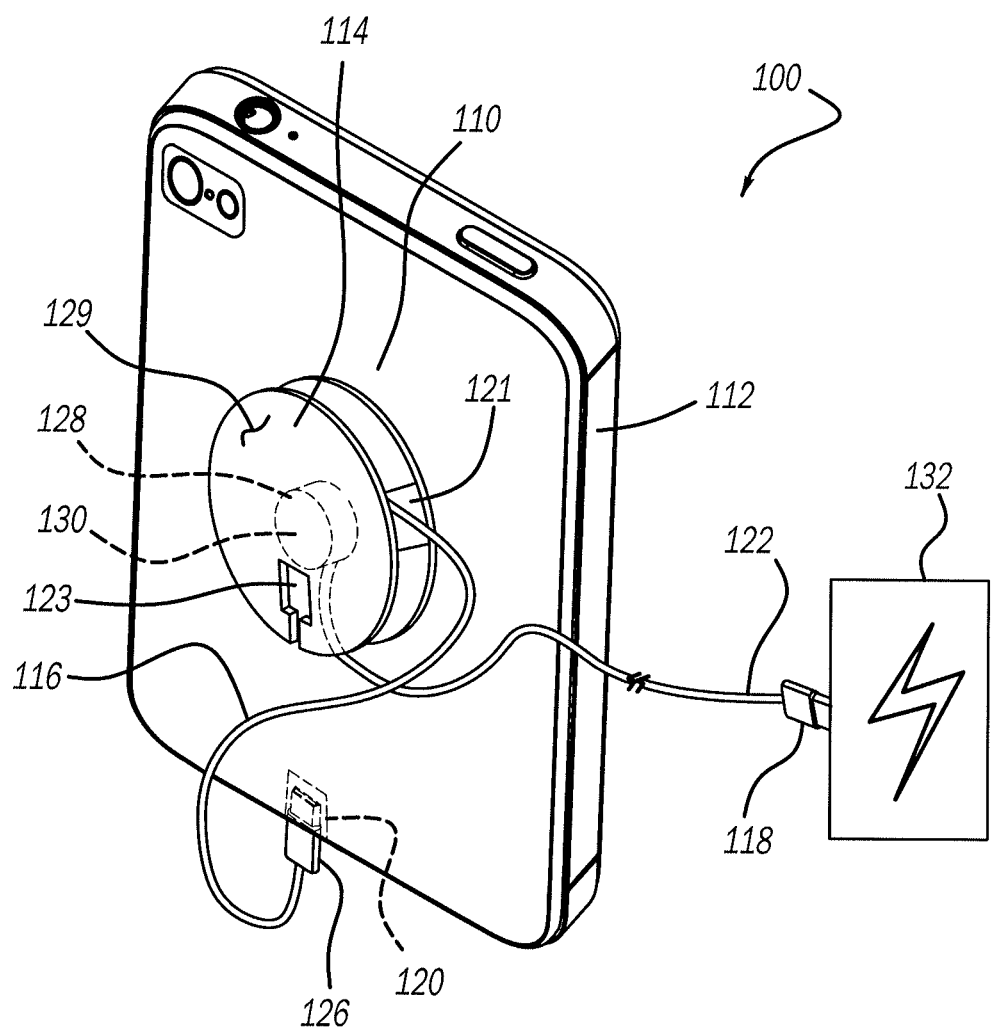
FIGS. 2A and 2B illustrate more detailed views of examples of the device for charging a portable electronic device.

Referring to FIG. 2A, a more detailed view of the components making up the device 110 are shown. In this example, the support member 115 of FIG. 1B is not shown, but it should be understood that it could be integrated in this example or any of the other examples shown and described in this specification.

In this example, as stated previously, the device 110 includes a housing 114. The housing 114 defines a cavity 129. The device 110 also includes a cable 116 that extends from the housing 114 via an opening 121.

The cable 116 may have a connector 126 that has configured to connect to the charging port 120 of the mobile phone 112. As such, the connector 126 may be any type of connector commonly found on a mobile phone or other portable electronic devices. This type of connector may include a USB Type-C connector, a USB mini connector, a micro USB connector, or a Lightning connector, commonly found on devices produced by Apple, Inc. of Cupertino, California. The cable 116 may be of such a length so as to adequately connect to the port 120 but short enough so as to be readily stored within the cavity 129 of the housing 114. The housing 114 may also have a cavity for allowing the connector 126 to be stored therein, similar to the cavity 123 which allows for the storage of the connector 118.

The device 110 also includes a second cable 122 which has a connector 118. The connector of the second cable 133 may be any type of connector. The first cable 116 and the second cable 122 are in electrical communication with each other. The cable 122 is generally greater in length as it is intended to connect to a power source 132 via the connector 118. As such, the second cable 122 may also wrap around a post 128 or may also include a retraction device 130 so as to allow the retraction of the second cable 122 so as to be stored neatly within the housing 114 of the device 110.

Because the first cable 116 and the second cable 122 are in electrical communication with each other, when connected as shown in FIG. 2A, the device 110 can transmit power from the power source 132 via the connector 118 through the cable 122 and eventually to the charging port 120 via the connector 126 of the first cable 116. After completing charging, the operator can then retract the second cable 122 neatly within the housing 114 of the device 110 for later storage. Also, the connector 118 and portions of the second cable 122 may be placed back within the cavity 123 so as to neatly store these components.

The housing 114 may also include an energy storage device, such as a battery or capacitor. The battery or capacitor may be in electrical communication with the cables 116 and 122. If the housing 114 utilizes an energy storage device, the energy storage device utilize the cables 116 and/or 122 to charge the energy storage device, but also connect the mobile device 112 to the energy storage device, so as to provide power to the mobile device 112. Additionally, the energy storage device located within the housing 114 could be charged by another methodology such as radiofrequency, solar energy, vibrations, static electricity, and the like. The energy storage device can store amounts of energy over a period of time for later discharge emergency situations.

By so doing, a device 114 has the advantages over prior art solutions which do not include the cable or, if they do include a cable, require all or some of the cable to be stored outside of the housing 114 making the appearance of the mobile phone 112 looking rather clumsy and unattractive.

Figure 2B:
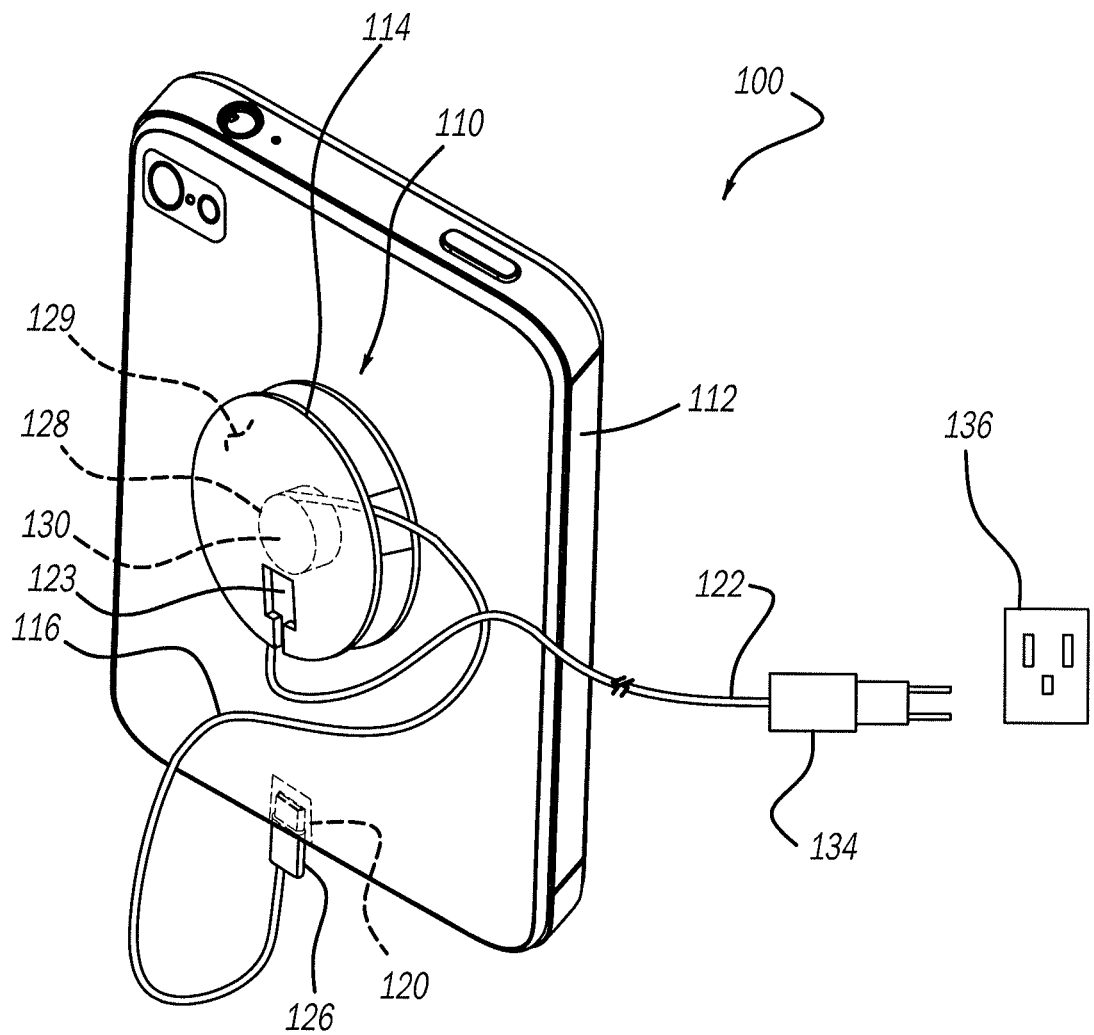

Referring to FIG. 2B, another example of the device 110 is shown. Here, like reference numerals have been utilized to refer to like elements and, as such, the previous description provided also applies. The example in FIG. 2B differs from that of FIG. 2A in that the cable 122 terminates with a plug 134 as opposed to a connector 118. The plug 134 is such that is configured to connect to a socket 136. The plug 134 and the socket 136 may be any kind of common electrical socket found. As it is well known, different countries and different regions utilize different types of electrical plugs and electrical sockets, and it should be understood that the description contemplates the use of any and all different types of plug and socket devices current known.

Figure 3A:
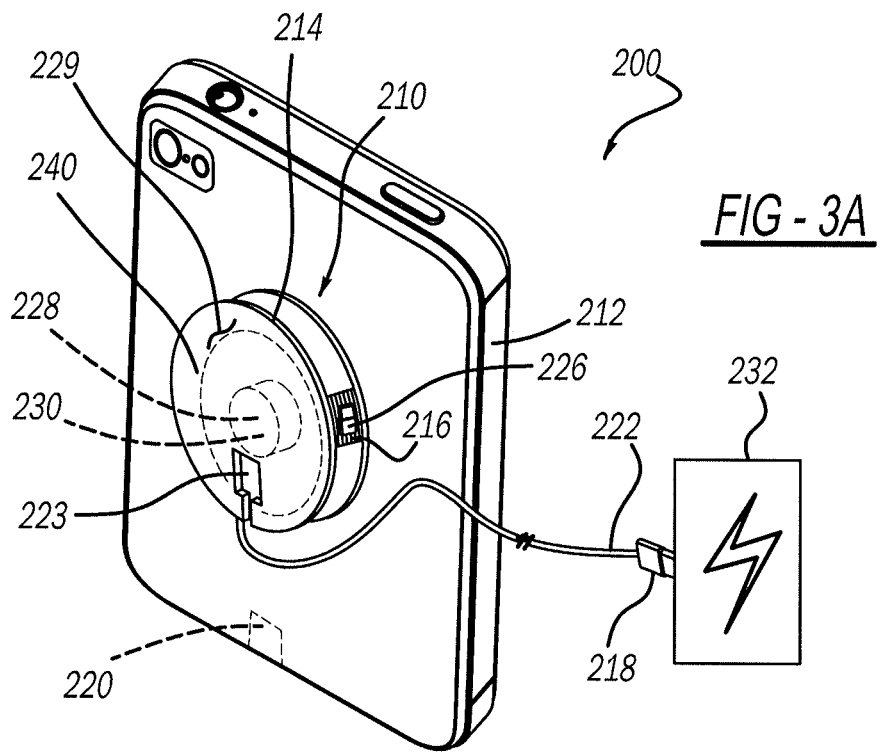
FIGS. 3A and 3B illustrate more detailed views of examples of the device having an inductive charging component.

Referring to FIG. 3A, another example of the device 210 is shown. It should be understood that like reference numerals have been generally utilized to refer to like elements described previously in the specification, with the exception that these elements have been incremented by 100. Here, like before, the device 210 includes a cable 222 that terminates with a connector 218. This connector 218 is connected to a power source 232 for providing power to the cable 222. However, in this example, the device 210 differs from that of the devices previously described in that the device includes an inductive charger illustrated as inductive charging component 240 formed within the housing 214.

As such, when the connector 218 is connected to a power source 232 electricity is provided to the cable 222 and eventually to the inductive charging component 240. Assuming that the device 212 has an inductive charging feature, the inductive charging component 240 is able to charge the battery of the mobile device 212 using an inductive charging methodology. One type of inductive charging standard is the Qi standard. The Qi standard is an open interface standard that defines wireless power transfer using inductive charging over certain distances. As such, the device 210 may be such that it utilizes the Qi standard.

Figure 3B:
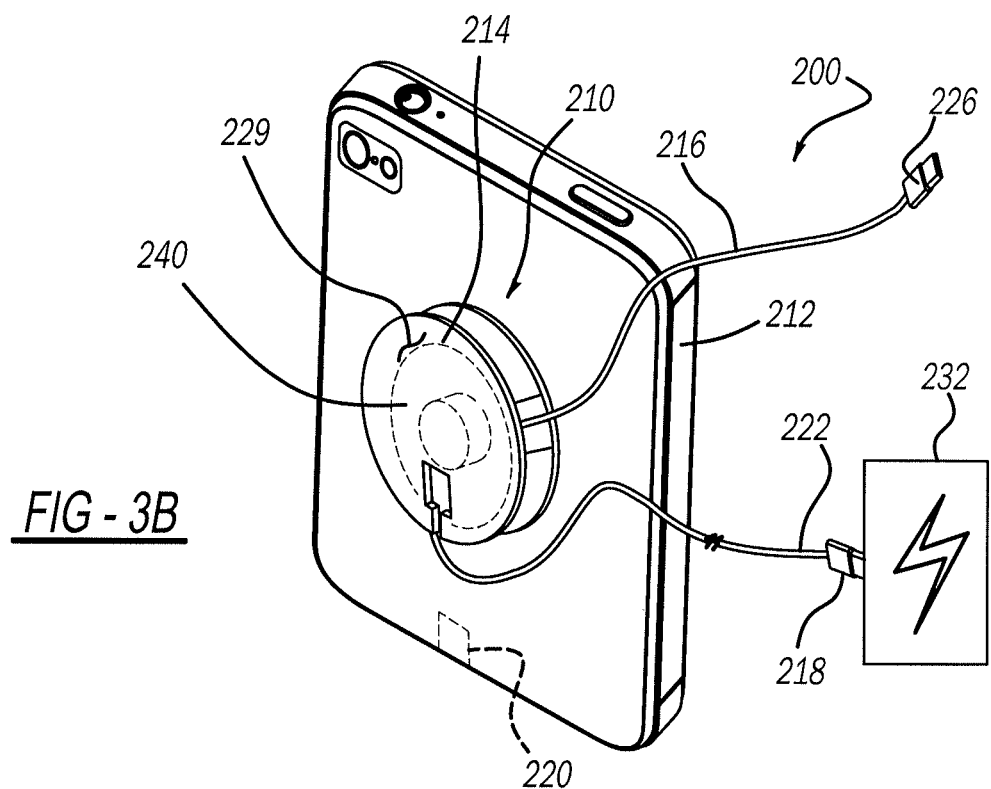

Referring to FIG. 3B another example of the device 210 is shown. Here, the device 210 of FIG. 3B is similar to the device 210 of FIG. 3A, with the exception that the device shown in FIG. 3B also includes a cable 216, similar to that shown in FIGS. 2A and 2B. Here, like before, the cable 216 terminates with the connector 226 that may connect to the charging port 220 of the mobile device. Alternatively, the connector 226 could connect to the charging port of a completely different portable electronic device. As such, in this example, the mobile device 212 may be charged using the inductive charging component 240 and/or the connector 226. Therefore, this example provides the flexibility of charging the mobile device 212 using either the inductive charging component 240 or directly via the connector 226.

Additionally, with regards to both FIGS. 3A and 3B, it should be understood that while the examples shown in these figures showed the connector 218 connected to a power source 232, it should be understood that the connector 218 may be replaced with a plug and a socket, such as plug 134 and socket 136 shown and described in FIG. 2B.

Figure 4A:
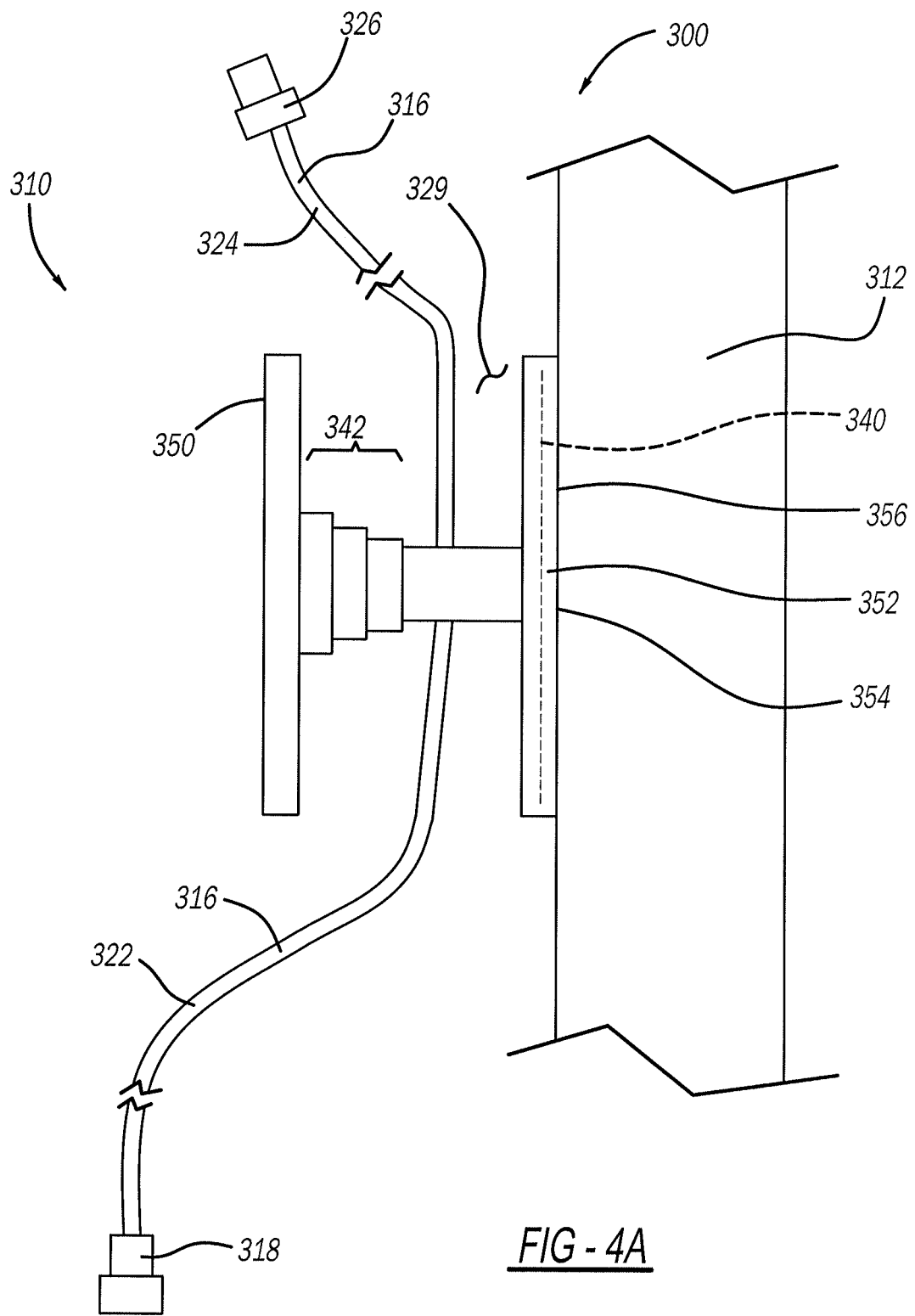
FIGS. 4A, 4B, and 4C illustrate a side view of the device for charging a portable electronic device, the device in these figures being collapsible.
Figure 4B:
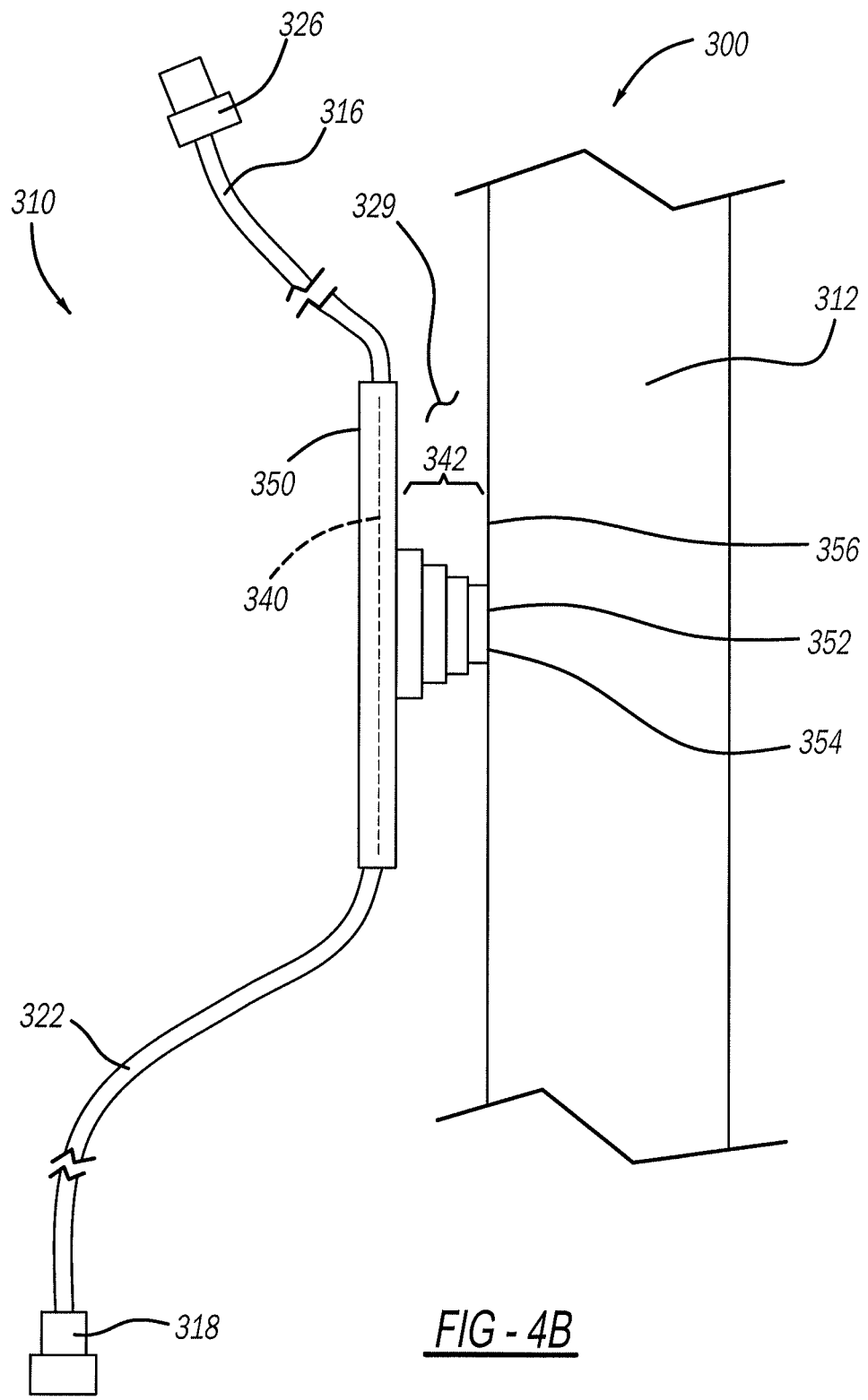
Figure 4C:
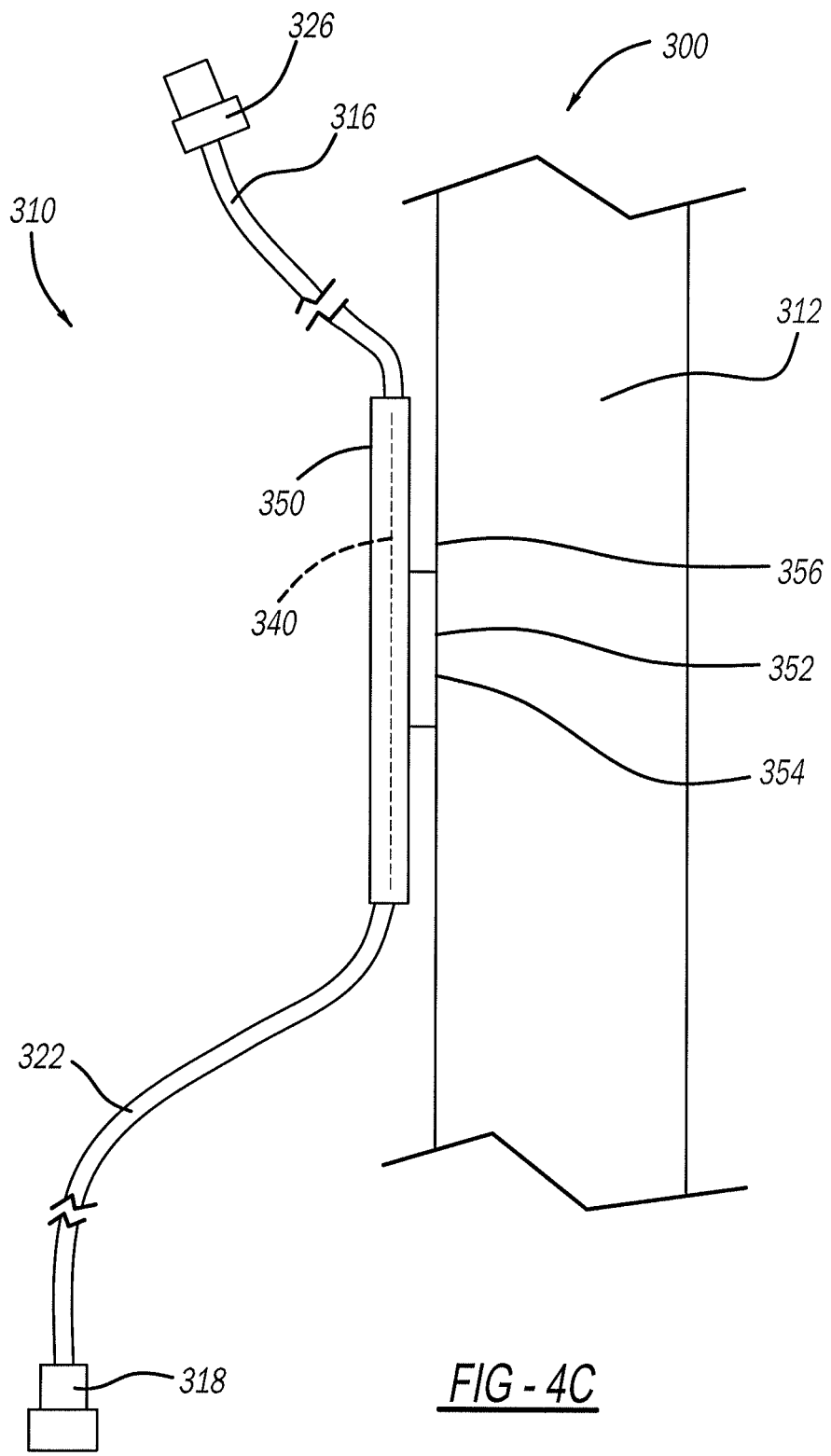

Referring to FIGS. 4A, 4B and 4C, a side view of the device 310 is shown with different optional implementations. It should be understood that like reference numerals have been used to refer to like numerals with the exception that the reference numerals have been incremented by 100 or 200. It should also be understood that the example shown in FIG. 4 may include elements that could be readily incorporated in any of the other examples discussed in this specification.

Here, the phone 312 is shown connected to the device 310. The device 310 has a surface 354 that is flush with a surface 356 of the phone 312. An adhesive 352 may be utilized so as to fixedly attach the device 310 to the phone 312. The adhesive 352 could be a magnet or any other type of means for joining two separate items together.

FIG. 4A illustrates the device 310 where an independent cord may be used in conjunction with the device 310, rather than using an integrated retractable cord the cord may be wrapped around portions of and, for example, stored within the space 329 of housing.

FIG. 4B illustrates the device 310 with a retractable cable. The device 310 may also include a second surface 350 that defines a space 329 between the surfaces 354 and 350. The surface 350 may be connected to one or more collapsing components 342 that essentially allow the extension or retraction of the surface 350 in relation to the phone 312. So, for example, as shown in FIG. 4, the surface 350 is in an extended position. The ability to allow the surface 350 to extend or retract has the advantage of providing additional space 329 for storing the cable 316 but also allows for one to utilize the device 310 as a stand for holding up the phone 312 when the surface 350 is fully retracted from the phone 312. Essentially, the operator of the phone 312 can extend the surface 350 and prop up the phone 312 on a support surface so as to be able to view the screen of the phone 312 without holding on to the phone 312 with one or more hands.

FIG. 4C illustrates the device 310 from 4B after being collapsed. 4A and 4B are showing a retractable cable that is part of the device.

Also, it should be understood that the different elements shown in the previously described embodiments may be equally incorporated within the device 310 shown in FIGS. 4A, 4B, and 4C. Additionally, if the device 310 does not include the inductive charging component 340, this component would be removed from this example. Again, it should be understood that each of the elements shown and described in the figures can be removed or added to the other examples provided.

Figure 5A:
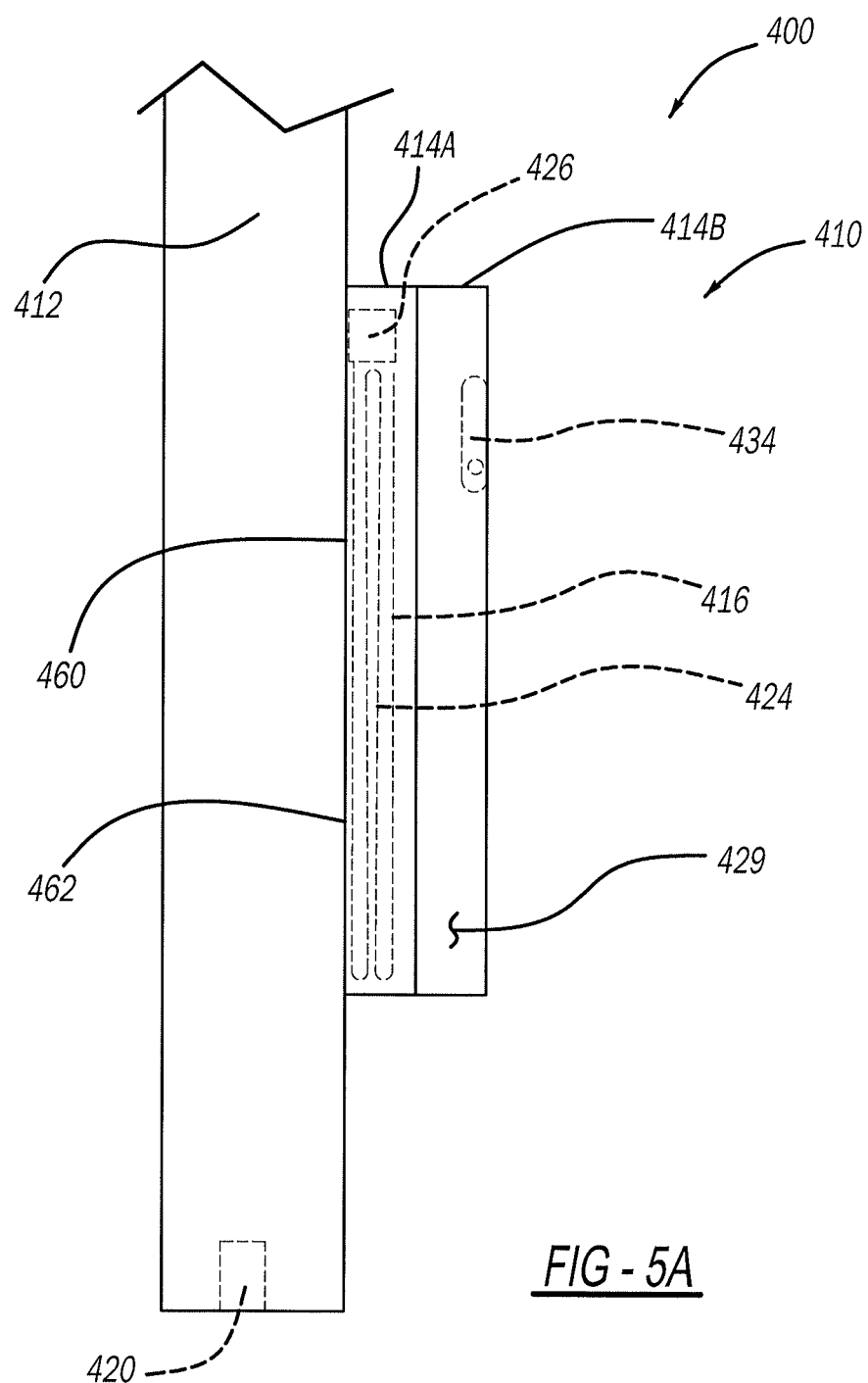
FIGS. 5A, 5B, 6A, 6B, 6C, and 6D illustrate other examples of the device for charging a portable electronic device, the device in these figures have two separable parts.
Figure 5B:
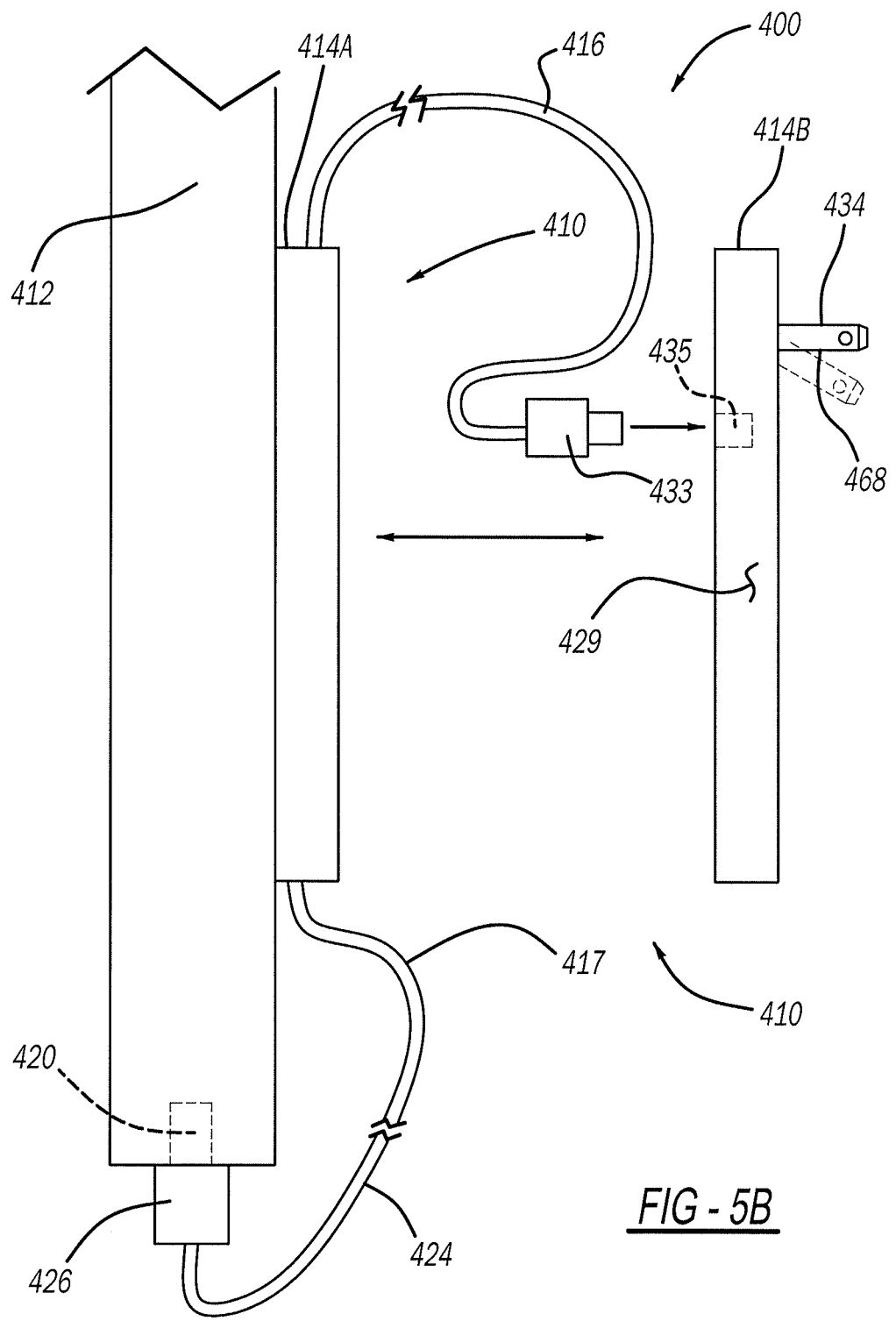

Referring to FIGS. 5A and 5B, another example of the device 410 is shown. Like before, like reference numerals have been utilized to refer to like components with the exception that they have been incremented by 100. Here, the device 410 includes a first part 414A and a second part 414B. The first part 414A has a surface 460 that is attached to the mobile device 412 using an adhesive 462. The first part 414A and the second part 414B are selectively separable from one another. That is, they can be connected to each other at sometimes but separated from each other at other times. The second part 414B may attach to the outer surface of the first part 414A. The first part 414A may store the cable for connection to the second part 414B. In some situations an electrical contact could be created between the first part 414A and the second part 414B allowing both parts to securely connect and transfer electric power.

The methodology for connecting the first part 414A to the second part 414B can include any one of a number of different known methodologies. For example, the first part 414A and second part 414B may be connected to each other through one or more clips that allow the second part 414B to be removable from the first part 414A or magnets that allow the first part 414A and second part 4146 the be magnetically coupled to each other. The cavity may be formed within the first part 414A. The cavity 429 functions to store a cable 416 when the second part 414B is connected to the first part 414A.

The cable 417 has a first part 424 that includes a connector 426 that is configured to connect to a charging port 420 of the mobile device 412. Opposite of the connector 426 on the cable 416 is a connector 433 that can be connected to a port 435 of the second part 414B. The port 435 is in electrical communication a power unit (e.g. a capacitor, power supply, battery, etc.) which may be powered with the prongs 434. As such, when the prongs 434 are inserted into a wall socket, electricity is transferred from the wall socket, through the prongs 434 and to the cable 416 via the port 435. This in turn provides power to the cable 417 and eventually to the port 420 of the portable electronic device 412.

The prongs 434 our configured to connect to a wall socket and therefore provides electricity to the cable 416 and eventually to the mobile device 412. The prongs 434 may be foldable in such a way that they can fold into the housing that defines the second part 414B of the device 410. Of course, it should be understood that instead of using prongs 434, a connector, such as a USB connector or other type of connector may be utilized and connected to a power source so as to provide power to the cable 416 and eventually to the mobile device 412. For example, connector 433 may be directly connected to an electricity source.

As such, in the examples shown in FIGS. 5A and 5B, the first part 414A may define a cavity or storage space 429 so as to store the cable 416. This is advantageous because it allows for the cable to be neatly stored when not in use.

Referring to FIGS. 6A, 6B, 6C, and 6D, another example of the device 410 is shown. Here, the device 410 of FIGS. 6A, 6B, 6C, and 6D is similar to the device 410 of FIGS. 5A and 5B, however, in this example, the device 410 of 6A, 6B, 6C, and 6D has the cable 422 extending between the second part 414B of the device 410 to the first part 414A of the device 410. The second part 414B may sit flush within a cavity formed within the first part 414A. In situations when the second part 414B sits flush within the cavity form within the first part 414A, an electrical contact could be created allowing both parts to securely connect and transfer electric power. The cavity 429 may be formed entirely within the first part 414A or may be formed within both parts 414A and/or 414B. The cavity 429 functions to store the cable 416. Various portions of the housing may include features to store and retain the connectors on either end of the cable.

From there, power is provided to the mobile device 412 via the first part 424 of the cable 416 which is connected to the port 420 via a connector 426. While connector 426 is illustrated on the side of the second part 414B, connector 426 may be positioned into the top surface of second part 414B when not in use and for example may positioned between the prongs 434 similar to connector 418.

Additionally or alternatively, power may be provided to the mobile device 412 via the inductive charging element 440. As such, the device shown in this figure may either have one or both of the first part 424 of the cable 416 and/or inductive charging element 440 so as to provide power to the mobile device 412.

Figure 6A:
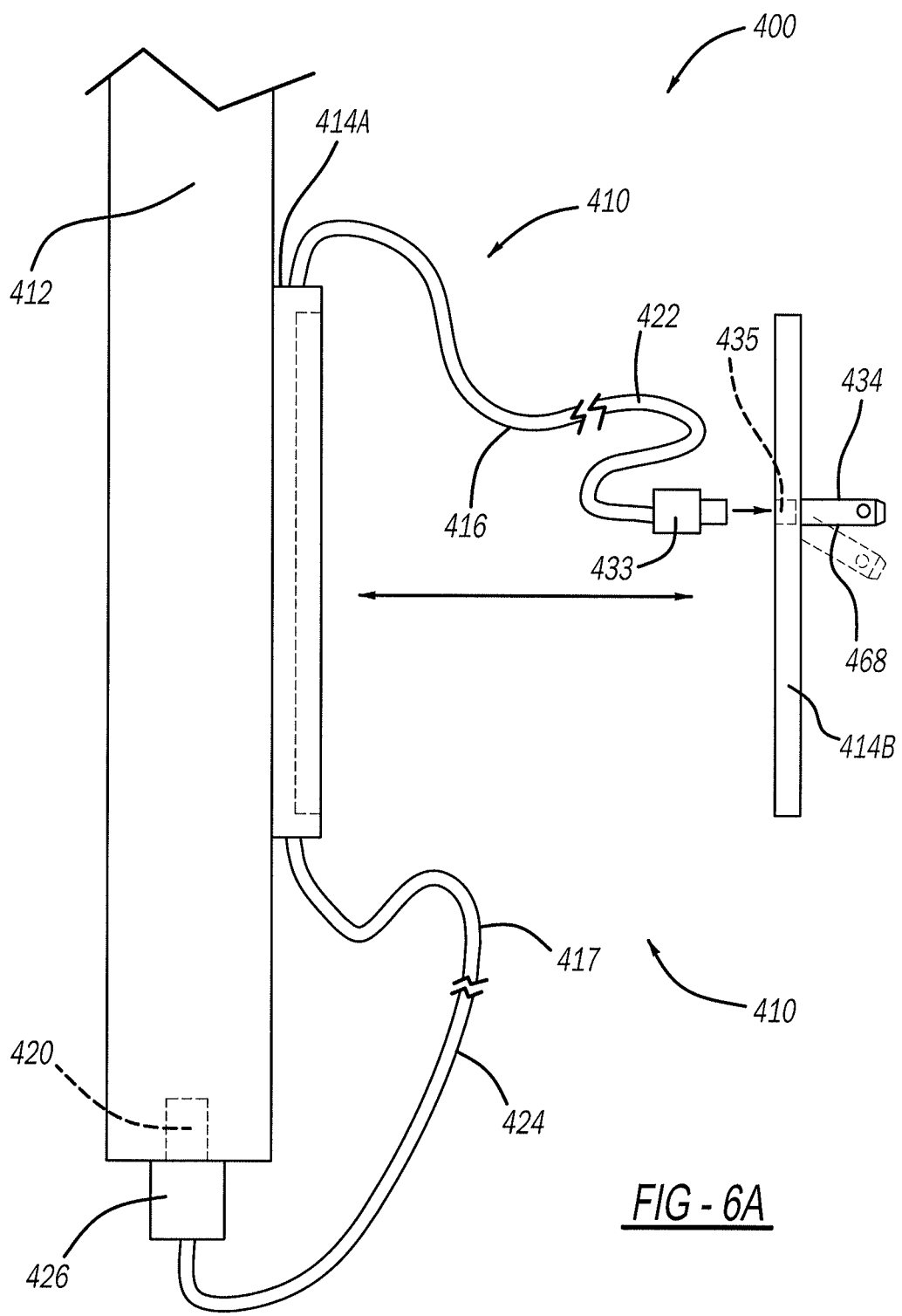
Figure 6B:
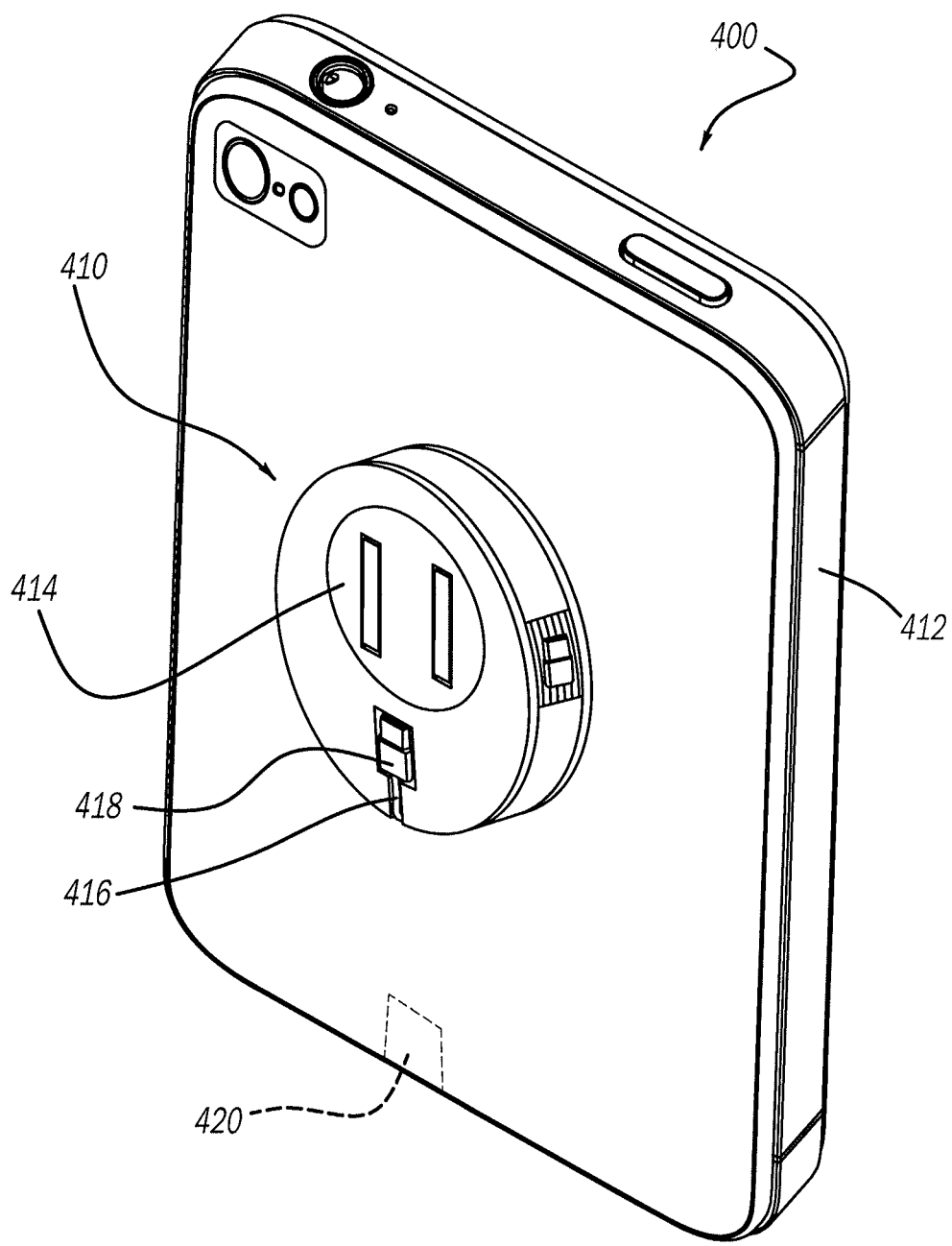
Figure 6C:
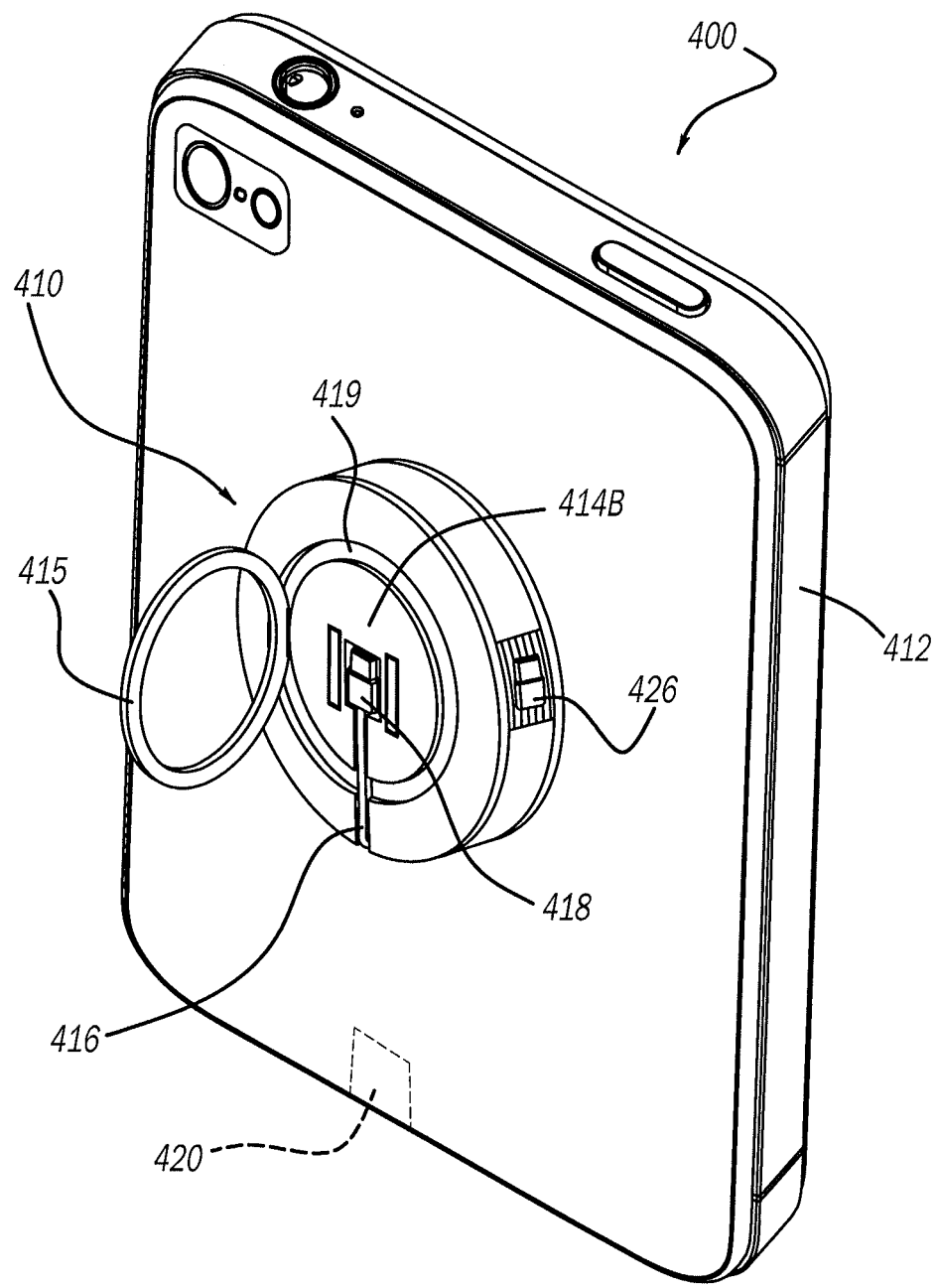

As to FIG. 6C, this figure is similar to the other examples provided, but further includes a support ring 415 that is rotatably attached the device 410 and can be stored within a channel 419, as mentioned in previous examples.

Figure 6D:
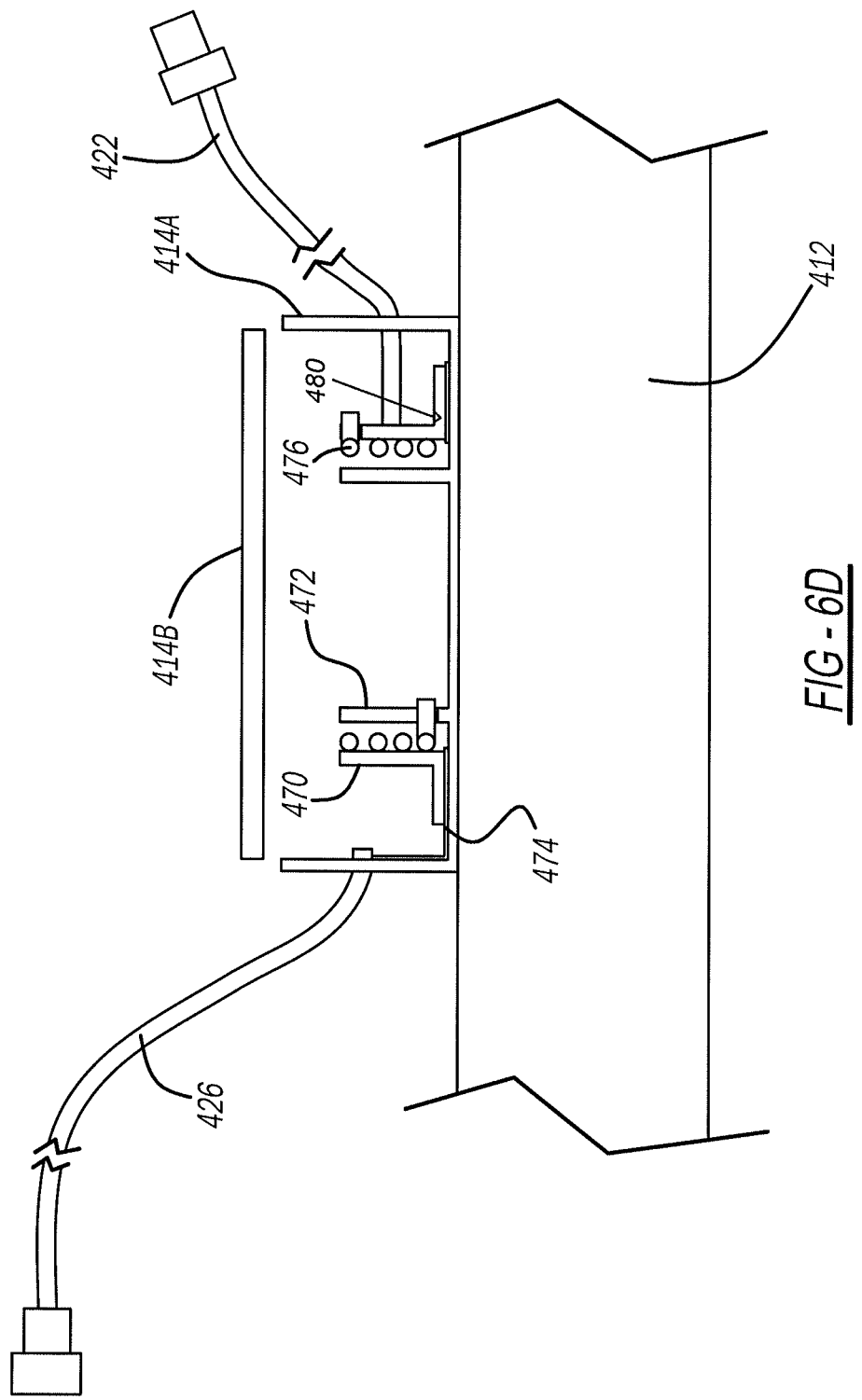

FIG. 6D is a sectional side view of one implementation of the device 410 with a retractable cord. The first part 414A and/or the second part 414B may include a hub 472. The hub 472 may be used to store a battery, or other power storage or power transfer device. In some implementations, the second part 414B may include the battery or other power device and may sit inside the hub 472 of the first part 414A. A disk 470 may be seated around the hub 472 and may be configure to rotate (e.g. concentrically) around the hub 472. A spring 476 may be connected between the hub 772 and the disk 470. Accordingly, the diameter inside the hub 472 may be 0.5-1.5 inches which is available for storage. This design is particularly unique since a coil spring is not connected to a center pole of the device, but instead is attached to the outside wall of the hub allowing for extra storage space. However, it is understood that other features described in this application may be used in conjunction with a spring that is connected to a center pole. The cable 422 may be connected to the disk 470. As such, the spring 476 will act to retract the cable 422 by rotating the disk 470 when released. The disk 470 may include a groove 480 such that the cable 422 tracks the groove 480 and may be constrained by the groove 480 as it is retracted. The cable 422 may be electrically connected to traces on the disk 470. The traces on the disk 470 may be electrically connected to traces on the first part 414A, for example through brush contacts 474 on either the first part 414A or the disk 470. The traces on the first part 414A may be connected to the cable 424. The cable 424 may be fixed to the first part 414A.

Figure 7B:
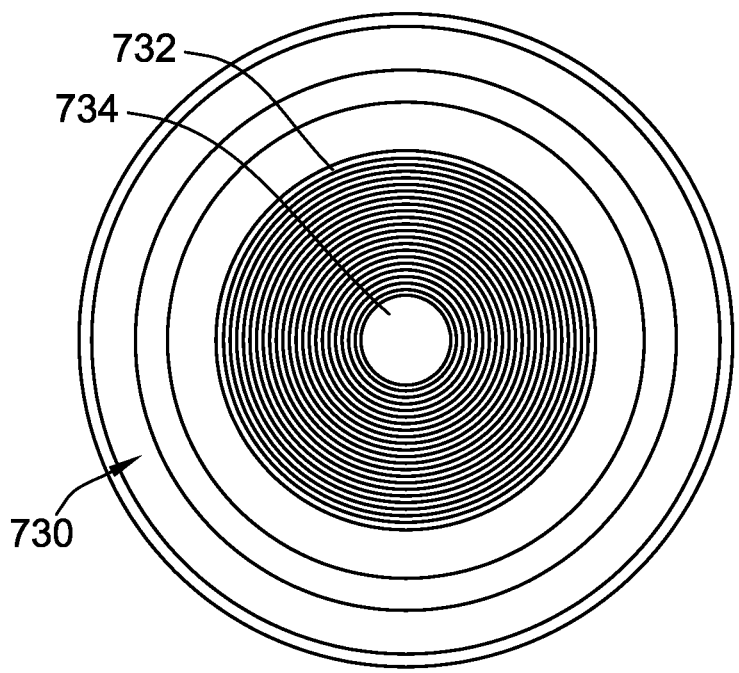
FIG. 7B is a top view of the device with a first coil exposed.
Figure 7C:
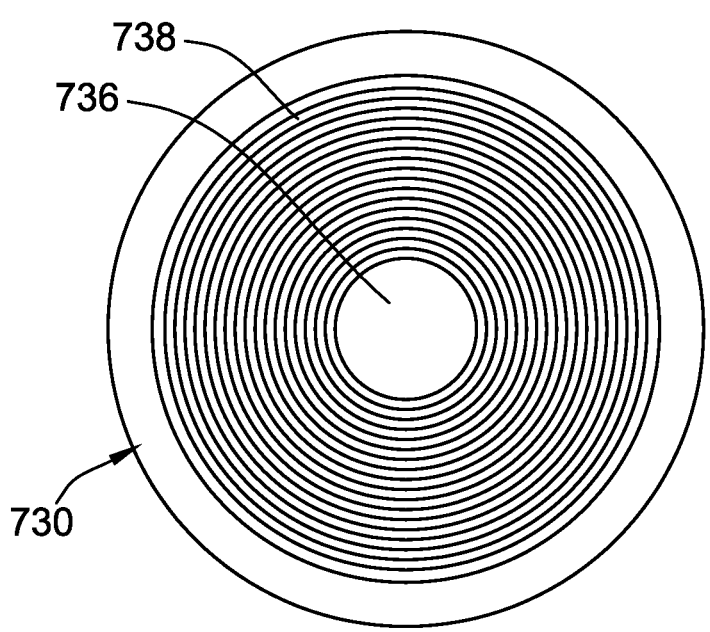
FIG. 7C is a bottom view of the device with a second coil exposed.

FIG. 7A is a sectional side view of one implementation of the device 710. The device 710 may also have the features noted in other devices discussed throughout this application. It may include a cable 720 that may be connected to a power source such as an outlet or a battery. The device 710 may include a multi-directional inductive charger 730. The multi-directional inductive charger 730 may be attached to a first part 714a of the device 710 or a second part 714b of the device 710. The multi-directional inductive charger 730 may emit power inductively in a first direction as denoted by arrow 754 to charge the mobile device 712 and in addition to a second direction indicated by arrow 752 to charge an accessory device 716, such as a watch or other wearable device that may in some instances be utilized in conjunction with the mobile device 712. The multi-directional inductive charger 730 may include a shielding layer 736 which may separate a first coil 732 and a first magnet 734 from a second coil 740 and a second magnet 738. The first coil 732 and magnet 734 may emit inductive energy to charge the accessory device 716, while second magnet 738 and coil 740 may emit energy in an opposite direction to charge the mobile device 712. The first coil 732 and second coil 738 may be connected to the cable 720 to receive power for generating the inductive power emissions. FIG. 7B shows an illustration of the either the first coil 732 prior to overmolding. FIG. 7C shows an illustration of the either the second coil 738 prior to overmolding.

Figure 8A:
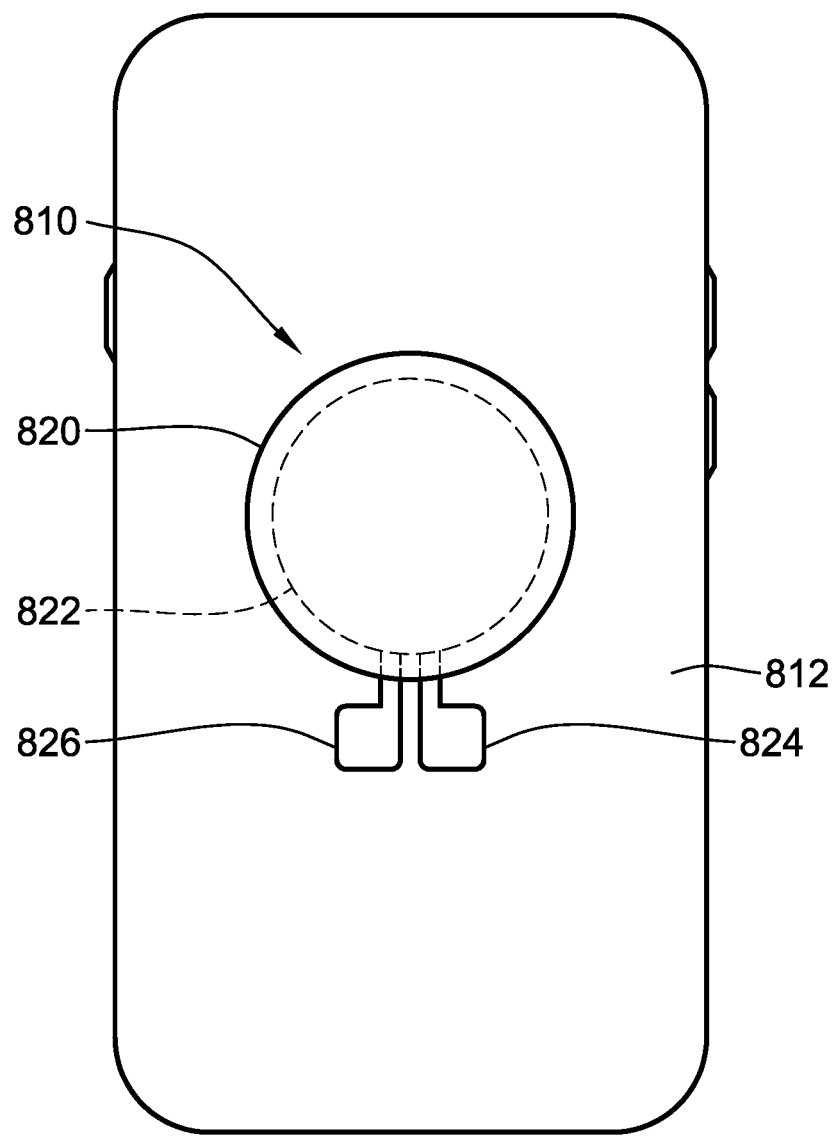
FIG. 8A is a top view of the device.
Figure 8B:
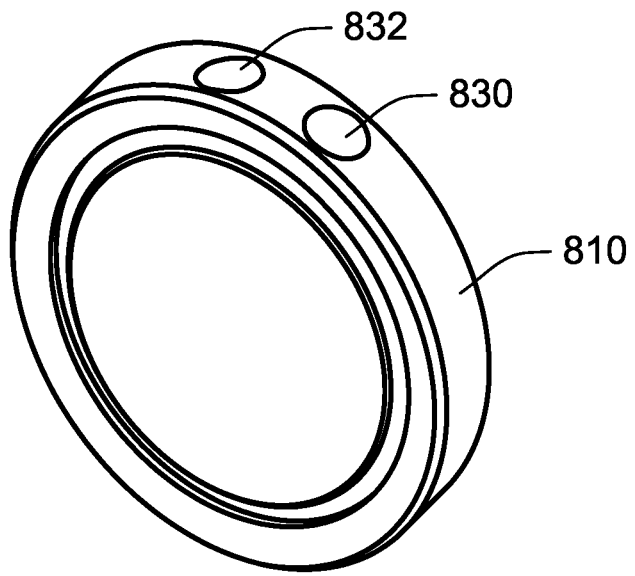
FIG. 8B is a perspective view of the device without earbuds.
Figure 8C:
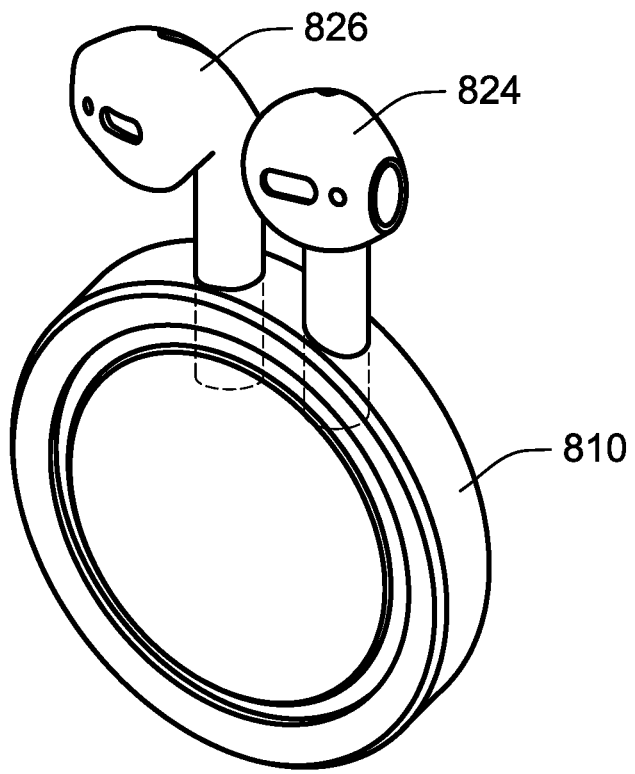
FIG. 8C is a perspective view of the device with earbuds.

FIG. 8A is a top view of a device 810. The device 810 may have features of any of the other devices described throughout the application in addition to the features described with regarding to FIG. 8. The device 810 may be connected to a mobile device 812. The housing device 810 may include a groove 820. The groove may include one or more electrical traces 822 that may provide power via a plug to a first earbud 824 and a second earbud 826. The first and second earbud 824, 826 may be held into the groove 820 by a recess that causes a press-fit attachment for other active gripping of the first and second earbuds 824, 826. As shown in FIG. 8B and FIG. 8C, the device may be designed so that just the ends of the earbuds 824, 826 are plugged into openings 830,832 in the device 810.

Figure 9:
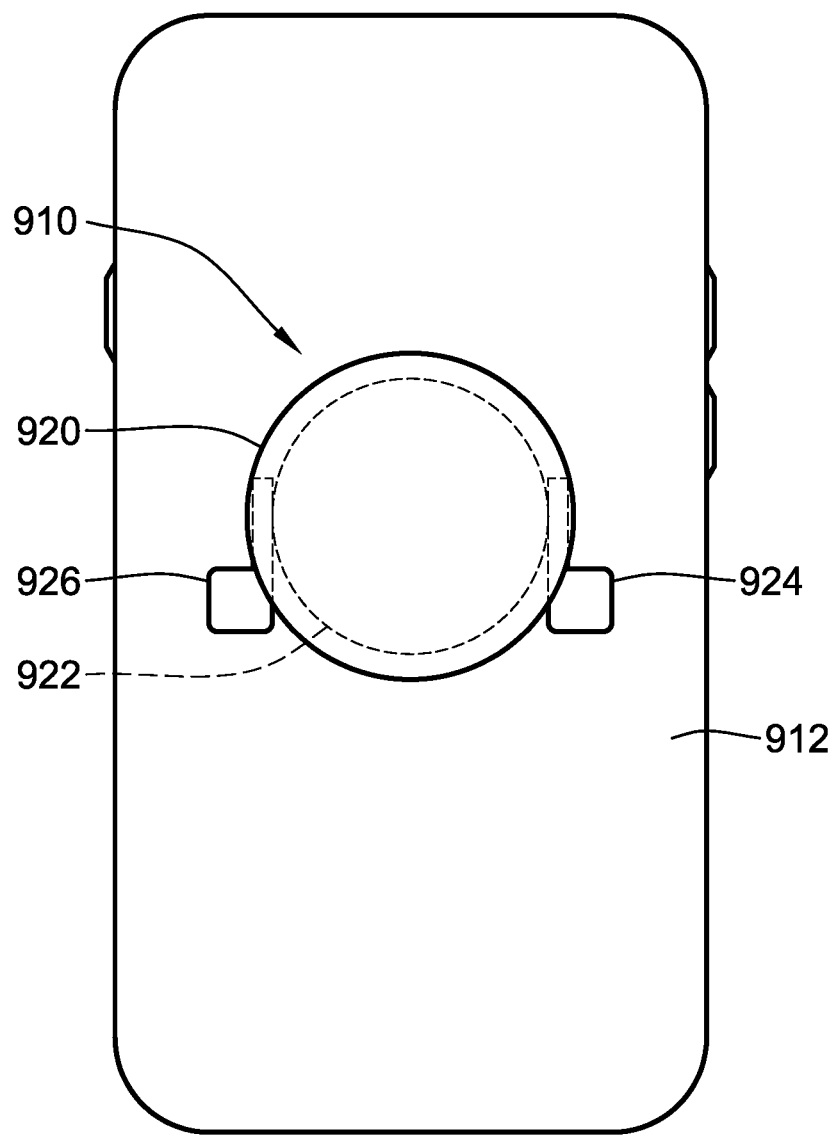
FIG. 9 is a top view of the device.

FIG. 9 is a top view of a device 910. The device 910 may have features of any of the other devices described throughout the application in addition to the features specifically described with regarding to FIG. 9. The device 910 may be connected to a mobile device 912. The housing device 910 may include a groove 920. The groove may include one or more electrical traces 922 that may provide power via a plug to a first earbud 924 and a second earbud 926. The first and second earbud 924, 926 may be held into the groove 920 by a recess that causes a press-fit attachment for other active gripping of the first and second earbuds 924, 926. As shown in FIG. 9, the device may be designed so that a portion along the side of the earbuds 924, 926 is retained by the device 910.

Figure 10A:
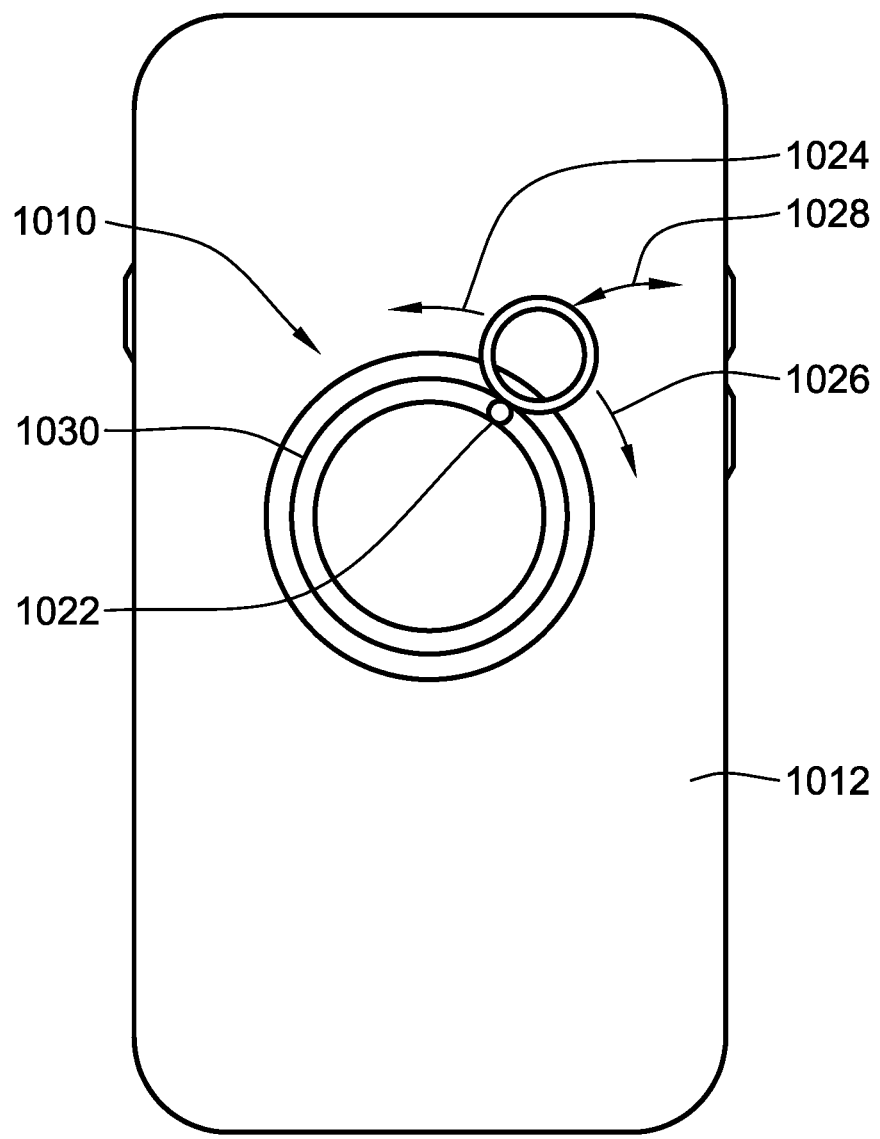
FIG. 10A is a top view of the device.
Figure 10B:
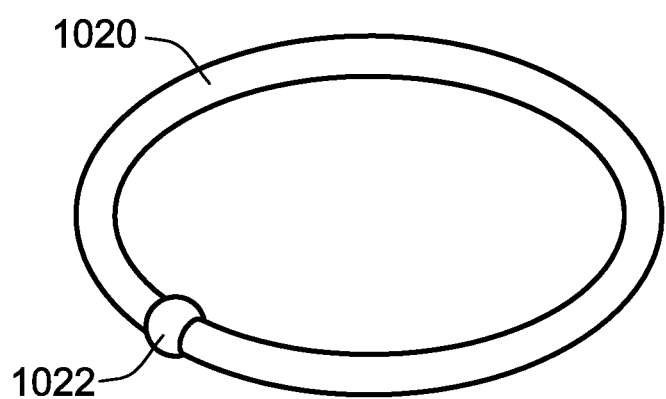
FIG. 10B is a perspective view of one implementation of the ring and ball.

FIG. 10A is a top view of a device 1010. The device 1010 may have features of any of the other devices described throughout the application in addition to the features specifically described with regarding to FIG. 10. Device 1010 is attached to a mobile device 1012. The device 1010 includes a ring 1020. The ring 1020 may be provided for supporting the mobile device 1012 or for better grasping by the user of the device 1010 or the mobile device 1012. The device 1010 may include a groove 1030. The groove 1030 may be circular although other shapes are contemplated such as a semi-circular or square or other geometries. The ring 1020 may be attached to a ball 1022. The ball 1022 may be retained in the groove 1030 such that the ball 1022 may travel freely along the groove and yet be retained within the groove by one or more edges that extend over and/or constrain the ball 1022 within the groove 1030. As such, the ring 1020 may be positioned anywhere along the groove 1030 as the ball 1022 is slid along the groove 1030 as denoted by arrows 1024 and 1026. In addition, the connection to the ball 1022 allows pivoting of the ring 1020 allowing the ring 1020 to pivot and tilt in any direction as denoted by arrow 1028 for freedom of placement to facilitate grasping or support of the mobile device 1012. FIG. 10B shows an implementation of the ring where the center of the ball is aligned with the center of the ring path. However, various alignment implementations are possible, such as a surface of the ball being attached to the surface of the ring as shown in FIG. 10A.

Figure 11A:
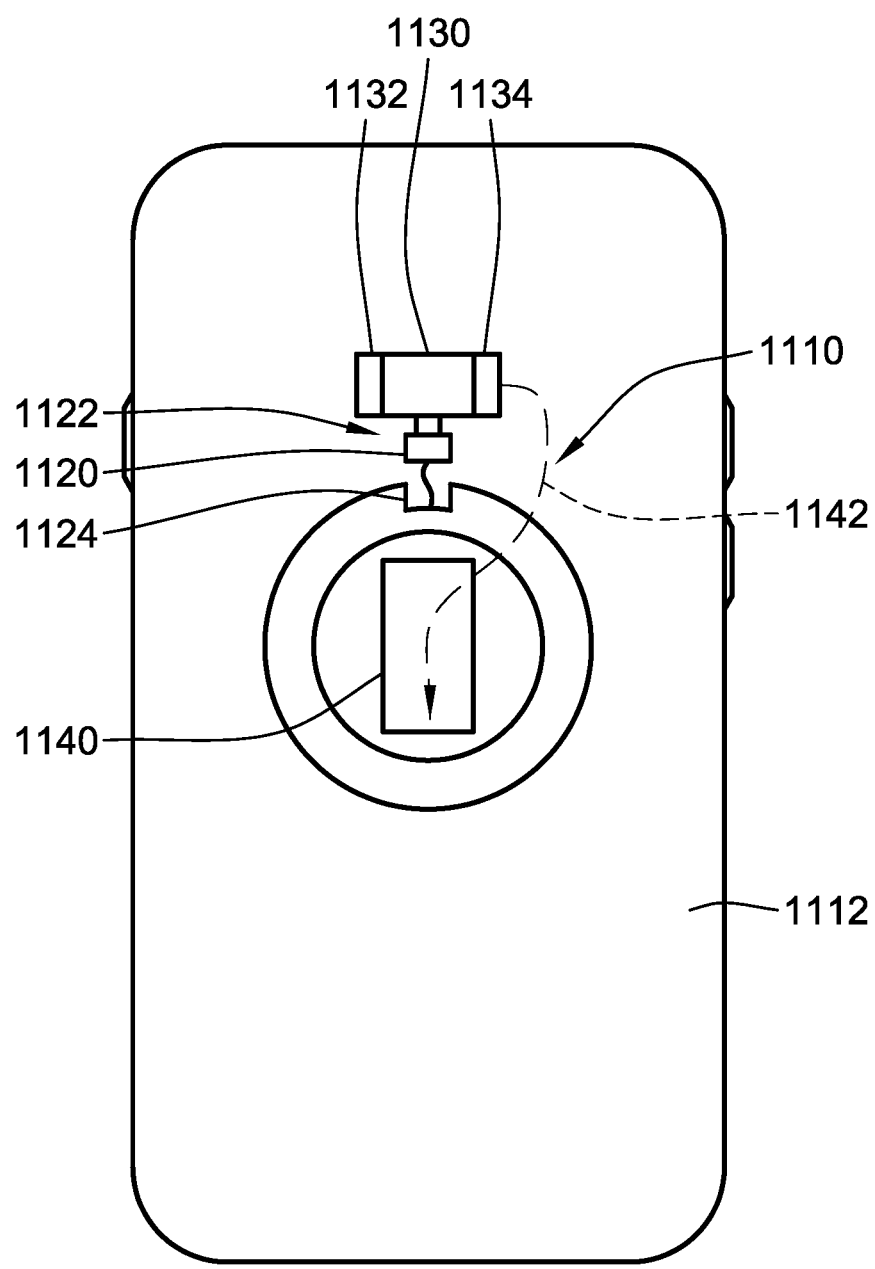
FIG. 11A is a top view of the device.
Figure 11B:
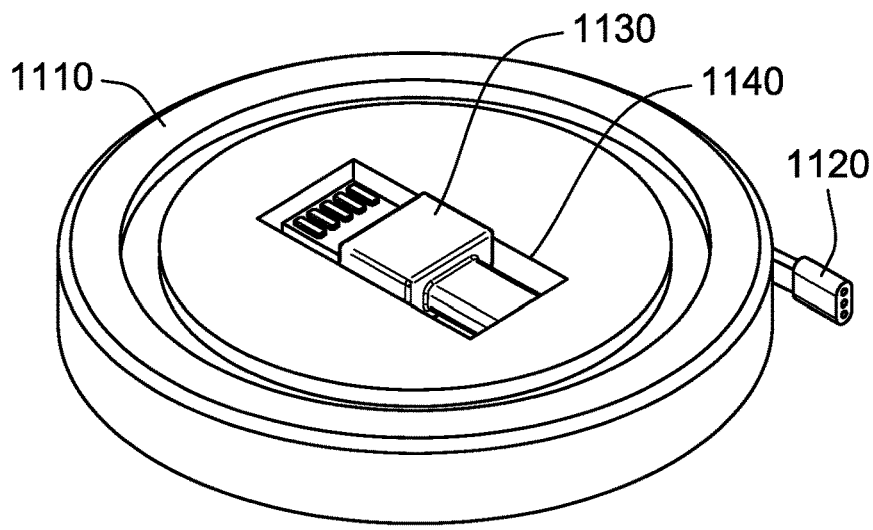
FIG. 11B is a perspective view of the device with the adapter stored in the recess.
Figure 11C:
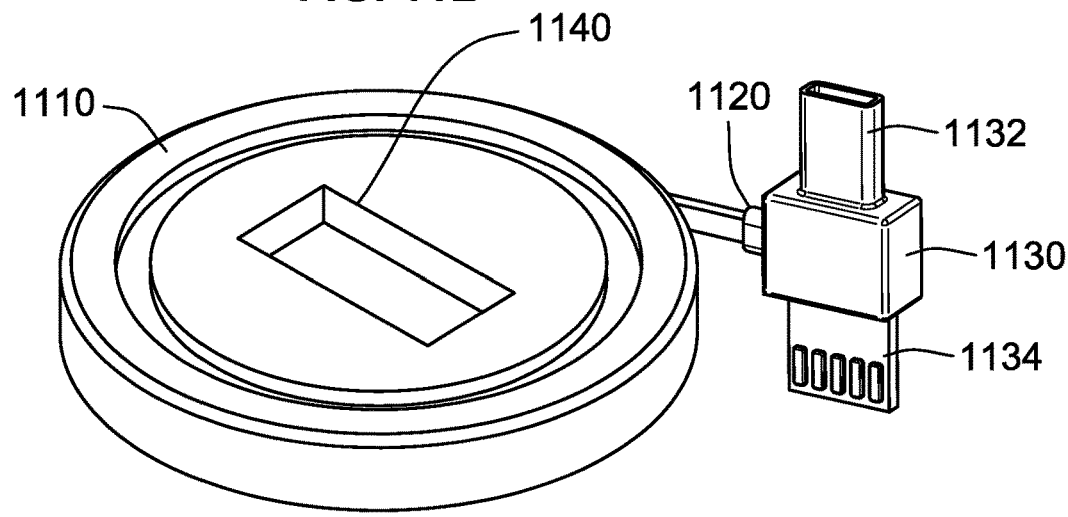
FIG. 11C is a perspective view of the device with the adapter joined with the connector.
Figure 11D:
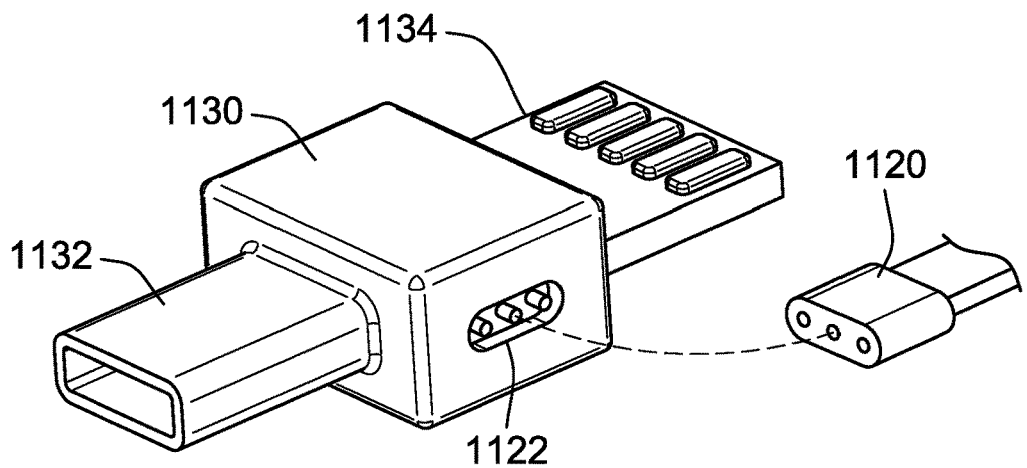
FIG. 11D is a perspective view of the adapter and the connector.

FIG. 11A is a top view of device 1110. The device 1110 is attached to the mobile device 1112. The 1110 may include a connector 1120 and an adapter 1130. The connector 1120 may be attached to a cable to provide power to the device 1110 or from the device 1110 as required. The connector 1120 may be retracted into a recess 1124 in the device 1110. The connector 1120 may plug into the adapter 1130. The connection between the connector 1120 and the adapter 1130 may be through a traditional connector such as a male C USB connector, a lightning connector, or a magnetic coupler in various implementations. The adapter 1130 may then provide one or more connectors, such as a first connector 1132 and a second connector 1134. The first connector 1132 may in some examples be a male C USB connector, although other connectors are contemplate herein. The second connector 1134 may be a male A USB connector or a female A USB connector although other connectors are also contemplated herein. The adapter 1130 may be configured to fit and stored within a recess 1140 as denoted by arrow 1142. FIG. 11B is a perspective view of the device with the adapter stored in the recess. FIG. 11C is a perspective view of the device with the adapter joined with the connector. FIG. 11D is a perspective view of the adapter and the connector.

Figure 12:
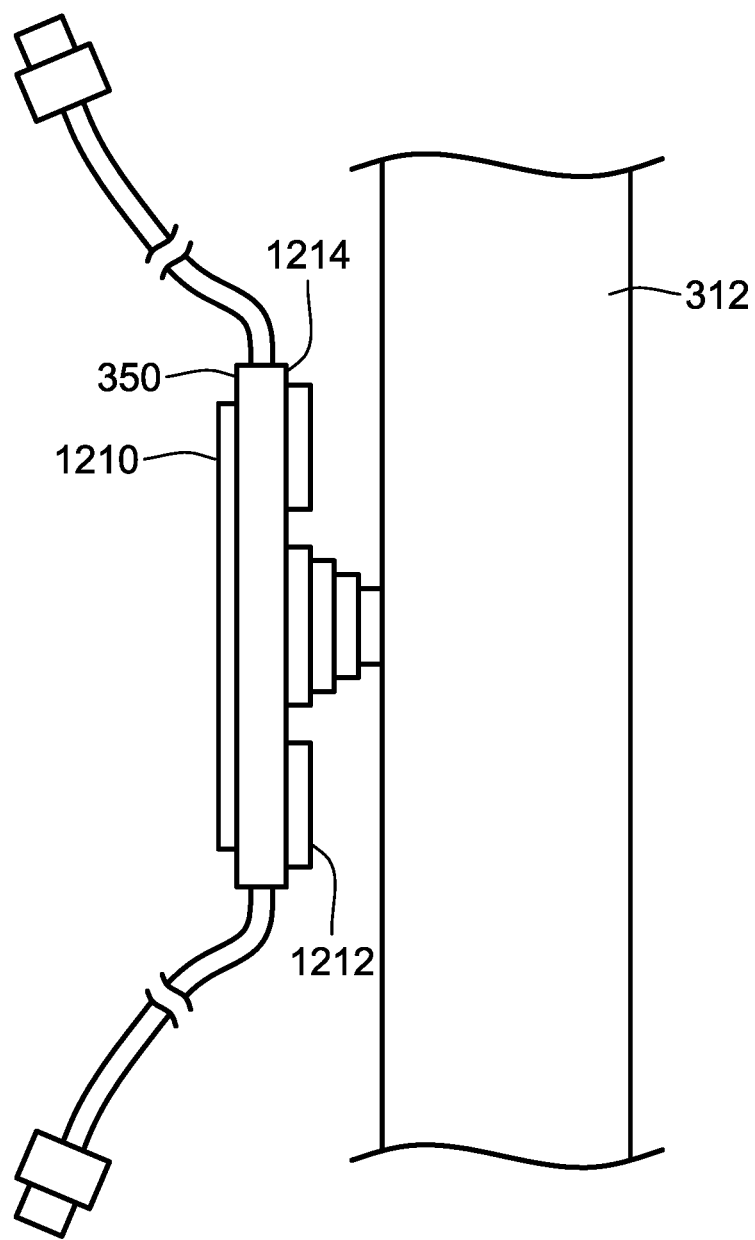
FIG. 12 is a side view of the telescoping implementation of the device.

FIG. 12 is a side view of the telescoping implementation similar to FIG. 4b. However, a foam pad 1210 may be provided on surface 350 for ease and comfort of grasping. Additionally, a foam pad 1212 may be located on an opposite surface 1214 facing the mobile device 312 again to provide comfort of grasping for the user. The foam pads 1210, 1212, may be made of a rubber or other elastic material.

Any of the cables discussed herein may take different forms. For example, different materials, gauges, and shapes (round or flat) may be used. For example, in certain implementation relevant to each Figure discussed, the cables may be flat cables to reduce space required to store the cable.

As a person skilled in the art will readily appreciate, the above description is meant as an illustration of an implementation of the principles this invention. This description is not intended to limit the scope or application of this invention in that the invention is susceptible to modification, variation, and change, without departing from the spirit of this invention, as defined in the following claims.

The invention claimed is:

1. A device for charging a portable electronic device having a battery, the device comprising:
a housing having a first surface configured to adhere to the portable electronic device and a second surface opposite the first surface;
a first cable having a first end and a second end, the second end configured to connect to a power source;
a multi-directional inductive charger formed in the housing, the multi-directional inductive charger in communication with the first end of the cable, the multi-directional inductive charger having a first coil and a second coil, the first coil structured to emit power in a first direction and charge the battery of the portable electronic device, the second coil structured to emit power in a second direction and charge a battery of an accessory positioned adjacent the second surface;
wherein the battery of the portable electronic device is capable of being charged when the second end of the first cable is connected to the power source; and wherein the housing defines a cavity configured to store the first cable within the cavity.

2. The device of claim 1, wherein the housing includes a first housing portion defining the first surface and a second housing portion defining the second surface, the second housing portion movable relative to the first housing portion and being configured to allow the first cable to be stored between the first and second housing portions.

3. The device of claim 1, wherein the housing is a collapsible housing configured to extend from the portable electronic device to an extended position and configured to retract the portable electronic device to a retracted position.

4. The device of claim 1, wherein the multi-directional charger includes a shielding layer separating the first coil and the second coil.

5. The device of claim 1, wherein the multi-directional charger includes a first magnet adjacent the first coil, and a second magnet adjacent the second coil.

6. The device of claim 5, wherein the multi-directional charger includes a shielding layer separating the first coil and first magnet from the second coil and second magnet.

7. The device of claim 1, wherein the housing has a center shaft located between the first and second surfaces, wherein the first is configured to wrap around the center shaft.

8. The device of claim 7, wherein the first surface or the second surface is substantially circular in shape.

9. The device of claim 1, wherein the first coil is positioned adjacent the first surface of the housing.

10. The device of claim 1, wherein the second coil is positioned adjacent the second surface of the housing.

11. A device for charging a portable electronic device, the device comprising:
a housing having a first surface configured to adhere to the portable electronic device;
a cable having a first portion with a first end connected to an inductive charging component and a second portion with a second end;
wherein a battery of the portable electronic device is capable of being charged via the inductive charging component when the second end of the cable is connected to a power source;
wherein the housing defines a cavity configured to store the cable within the cavity when the cable is not connected to the power source; and
wherein the housing comprises openings are configured to receive and charge earbuds, the housing including electrical traces in communication with the first portion of the cable to transmit power to the earbuds.

12. The device of claim 11, further comprising a retractor located within the housing, the retractor connected to the cable and being configured to allow an extension or retraction of the second portion of the cable from the housing.

13. The device of claim 11, wherein the housing is a collapsible housing configured to extend from the portable electronic device to an extended position and configured to retract the portable electronic device to a retracted position.

14. The device of claim 11, wherein the housing has a second surface opposite the first surface, and wherein the inductive charging component is a multi-directional inductive charger formed in the housing, the multi-directional inductive charger having a first coil and a second coil, the first coil structured to emit power in a first direction and charge the battery of the portable electronic device, the second coil structured to emit power in a second direction and charge a battery of an accessory positioned adjacent the second surface.

15. The device of claim 14, wherein the multi-directional charger includes a shielding layer separating the first coil and the second coil.

16. The device of claim 14, wherein the multi-directional charger includes a first magnet adjacent the first coil, and a second magnet adjacent the second coil.

17. The device of claim 11, wherein the housing has a center shaft, a top surface and a bottom surface, wherein the cable is configured to wrap around the center shaft.

18. The device of claim 17, wherein the housing is a collapsible housing configured to extend from the portable electronic device to an extended position and configured to retract the portable electronic device to a retracted position.

19. The device of claim 17, wherein the top surface or the bottom surface is substantially circular in shape.

20. The device of claim 11, wherein the housing includes a first housing portion defining the first surface and a second housing portion defining the second surface, the second housing portion movable relative to the first housing portion and being configured to allow the first cable to be stored between the first and second housing portions.

* * * * *